(12) United States Patent
Reyhani

(10) Patent No.: US 12,174,029 B1
(45) Date of Patent: Dec. 24, 2024

(54) SYSTEM AND METHOD FOR VEHICLE FUEL MANAGEMENT AND TRIP OPTIMIZATION

(71) Applicant: Geotech Corp., Miami, FL (US)

(72) Inventor: John A. Reyhani, Miami, FL (US)

(73) Assignee: Geotech Corp, Miami, FL (US)

( * ) Notice: Subject to any disclaimer, the term of this patent is extended or adjusted under 35 U.S.C. 154(b) by 0 days.

(21) Appl. No.: 18/210,013

(22) Filed: Jun. 14, 2023

Related U.S. Application Data

(60) Provisional application No. 63/389,181, filed on Jul. 14, 2022.

(51) Int. Cl.
*G01C 21/34* (2006.01)

(52) U.S. Cl.
CPC .................. *G01C 21/3469* (2013.01)

(58) Field of Classification Search
CPC ............ G01C 21/3469; G01C 21/3679; G01C 21/3676; G01C 21/3682; G01C 21/3685; G01C 21/3697; G08G 1/202; G08G 1/141; G08G 1/143; G08G 1/148; G06Q 10/02; G06Q 10/0631; G06Q 50/40; H04W 4/44; H04W 4/021; H04W 4/024
See application file for complete search history.

(56) References Cited

U.S. PATENT DOCUMENTS

| | | |
|---|---|---|
| 6,237,647 B1 | 5/2001 | Pong et al. |
| 6,338,008 B1 | 1/2002 | Kohut et al. |
| 8,798,830 B2 | 8/2014 | Sobue et al. |
| 8,880,337 B2 | 11/2014 | Scholl |
| 9,000,722 B2 | 4/2015 | Uyeki |
| 9,448,083 B2 | 9/2016 | Loftus et al. |
| 9,616,879 B2 | 4/2017 | Zhao et al. |
| 9,713,962 B2 | 7/2017 | Payne et al. |
| 9,739,624 B2 | 8/2017 | Rajagopalan et al. |
| 9,805,317 B2 | 10/2017 | Gudat et al. |
| 9,835,465 B2 | 12/2017 | Stefan |
| 10,065,517 B1 | 9/2018 | Konrardy et al. |
| 10,220,705 B2 | 3/2019 | Ramanujam |
| 10,262,471 B2 | 4/2019 | Kislovskiy et al. |
| 10,288,439 B2 | 5/2019 | Pedersen |
| 10,324,463 B1 | 6/2019 | Konrardy et al. |

(Continued)

FOREIGN PATENT DOCUMENTS

DE 102018008990 A1 5/2019

*Primary Examiner* — Logan M Kraft
*Assistant Examiner* — Johnny H Hoang
(74) *Attorney, Agent, or Firm* — John Rizvi; John Rizvi, P.A.—The Patent Professor

(57) ABSTRACT

An artificial intelligence fuel management system and method that facilitates optimizing fuel management and vehicle service times for a variety of vehicle types through determining the remaining trip range for a vehicle and providing optimal routing and vehicle fueling options for a trip route involving autonomous vehicles, vehicle platoon management, and/or vehicular fuel management systems. The associated vehicles are fueled by at least one of a liquid fuel and an alternative fuel. The liquid fuel is either gasoline or diesel, and the alternative fuel is either electricity, biofuel, bio-alcohol, synthetic and paraffinic, steam, heat, vegetable and waste-derived oils, compressed air, liquid nitrogen, liquid petroleum gas, propane, hydrogen, ethanol, methanol, butanol, or natural gas.

20 Claims, 11 Drawing Sheets

(56) References Cited

U.S. PATENT DOCUMENTS

| | | | |
|---|---|---|---|
| 10,354,478 B2 | 7/2019 | Guo et al. | |
| 10,409,285 B2 | 9/2019 | Bostick et al. | |
| 10,415,982 B2 | 9/2019 | Park | |
| 10,429,198 B2 | 10/2019 | Shen | |
| 10,429,199 B2 | 10/2019 | Mason et al. | |
| 10,439,427 B2 | 10/2019 | Salter et al. | |
| 10,464,547 B2 | 11/2019 | Park et al. | |
| 10,467,581 B2 | 11/2019 | Laury et al. | |
| 10,691,126 B1 | 6/2020 | Konrardy et al. | |
| 10,753,754 B2 | 8/2020 | DeLizio | |
| 10,948,306 B2 | 3/2021 | Christen et al. | |
| 11,023,939 B2 | 6/2021 | Schweitzer et al. | |
| 11,105,284 B1* | 8/2021 | Dudar | F02M 25/0836 |
| 11,125,578 B2* | 9/2021 | Kilaru | G06Q 50/40 |
| 11,208,963 B1* | 12/2021 | Dudar | F02D 41/0045 |
| 2013/0261953 A1 | 10/2013 | Kiyama et al. | |
| 2013/0339072 A1 | 12/2013 | Touge | |
| 2017/0120761 A1 | 5/2017 | Kapadia et al. | |
| 2017/0193424 A1 | 7/2017 | Botea et al. | |
| 2017/0363432 A1* | 12/2017 | Hall | B67D 7/04 |
| 2018/0017399 A1 | 1/2018 | Rolnik | |
| 2018/0080427 A1* | 3/2018 | Ghannam | B60K 15/04 |
| 2018/0299897 A1 | 10/2018 | Cashler et al. | |
| 2018/0308069 A1 | 10/2018 | Starks | |
| 2018/0339712 A1 | 11/2018 | Kislovskiy et al. | |
| 2018/0341881 A1 | 11/2018 | Kislovskiy et al. | |
| 2019/0236959 A1* | 8/2019 | Belapurkar | G08G 1/22 |
| 2019/0287080 A1 | 9/2019 | Penilla et al. | |
| 2020/0017072 A1 | 1/2020 | Herman et al. | |
| 2020/0065679 A1 | 2/2020 | Javeri et al. | |
| 2020/0173800 A1 | 6/2020 | Dudar et al. | |
| 2020/0326714 A1 | 10/2020 | Iwamoto et al. | |
| 2021/0182993 A1* | 6/2021 | Arian | G06Q 30/02 |
| 2022/0107194 A1* | 4/2022 | Hagström | G01C 21/3697 |
| 2023/0015077 A1* | 1/2023 | Kim | G06Q 10/06315 |
| 2023/0090042 A1* | 3/2023 | Poloni | G01R 21/133 701/32.1 |
| 2023/0186878 A1* | 6/2023 | Wipperfürth | G06F 3/165 715/772 |
| 2023/0236033 A1* | 7/2023 | Simoudis | G01C 21/3423 701/425 |

\* cited by examiner

SYSTEM AND METHOD FOR VEHICLE FUEL MANAGEMENT AND TRIP OPTIMIZATION

CROSS-REFERENCE TO RELATED APPLICATION

This application claims the benefit of U.S. Provisional Patent Application No. 63/389,181 filed Jul. 14, 2022, which is hereby incorporated by reference herein in its entirety.

FIELD OF THE INVENTION

The present invention relates generally to vehicle trip management, and more particularly, to a system and method that facilitates optimizing fuel management and vehicle service times for a variety of vehicle types.

BACKGROUND OF THE INVENTION

Energy shortages and environmental pollution problems of modern society have led to an increased focused and attention on so-called green technologies and the reduction (or elimination) of fossil fuel reliance and the reduction of the planet's carbon footprint. This has translated in recent years to a great deal of development directed to battery electric vehicles (BEVs) and plug-in hybrid electric vehicles (PHEVs), known collectively as electric vehicles (EVs), and the popularity of such vehicles in society and the marketplace is growing steadily. Such vehicles are powered by an electric motor, either exclusively, or in conjunction with another power source, such as an internal combustion engine (ICE). Further, a high-voltage electrical power source (e.g., a high-voltage battery) is used to power the electric motor and other high voltage loads within the vehicle. In addition to the high voltage battery, a hybrid electric or electric vehicle may also have a low-voltage battery, which may be used to power vehicle lighting, engine cooling fans, heated seats, and/or other low-voltage loads.

A significant factor impacting the widespread adoption of electric vehicles is their relatively short range compared to conventional internal combustion engine powered vehicles. To some extent, the lack of range inherent in battery-powered vehicles is mitigated by range-extending technologies and approaches such as hybrid vehicles, improved battery capacity, battery reserve facilities and battery swapping stations. However, the range that is achievable by the vehicle when under electric power is still considered to be somewhat unpredictable and this has bred a fear that the vehicle has insufficient range to reach its destination, thus stranding the driver and their occupants at the roadside. This so-called "range anxiety" has causes reluctance on the part of the general car buying public to accept electric vehicles as a serious and long term proposition alongside conventional combustion engine vehicles.

Range anxiety may be alleviated if the user is provided with an accurate indicator of the available range of the vehicle. Further, whatever the type of engine that propels the vehicle, the fuel source and energy must be replenished from time to time in order to continue driving. For example, some vehicles rely on an all-electric drivetrain that is powered by energy stored in a battery, while other vehicles use a hybrid engine or even a combustion engine dependent on burning fossil fuel. Common to all types of vehicles is that the driver has an interest in monitoring the status of remaining energy in the vehicle, and in knowing how the level of available energy affects the remainder of the intended driving distance (e.g., the rest of the trip).

In the field of transportation, self-driving cars and vehicle platoons have gained significant interest, research, and development. A self-driving car (also known as an autonomous vehicle (AV), driver-less car, or robotic car), is a car incorporating vehicular automation, that is, a ground vehicle that is capable of sensing the surrounding environment and moving safely with little or no human input. Self-driving cars combine a variety of sensors to perceive their surroundings, such as thermographic cameras, radar, light detection and ranging (LIDAR), sonar, global positioning systems (GPS), odometry and inertial measurement units. Advanced control systems interpret sensory information to identify appropriate navigation paths, as well as obstacles and relevant signage. Autonomy in vehicles is often categorized in six levels, according to a system developed by the Society of Automotive Engineers (SAE). The SAE levels are as follows. Level 0—no automation/fully manual, Level 1—hands on/shared control/driver assistance; Level 2—hands off/partial automation; Level 3—eyes off/conditional automation, Level 4—mind off/high automation; and Level 5—steering wheel optional/fully autonomous.

In a related but different transportation focus, platooning is a method for driving a group of vehicles together and thereby increasing the capacity of roads, for example, via an automated highway system. Platoons decrease the distances between vehicles (e.g., cars, buses and/or trucks) using electronic and/or mechanical coupling. This capability allows for multiple vehicles to accelerate or brake simultaneously and allows for a closer headway between vehicles by eliminating reacting distance needed for human reaction. As such, road vehicle platooning confers several advantages. A platoon of vehicles uses less energy than individual vehicles and can result in fuel savings for all vehicles. A platoon of vehicles can safely follow each other at close distances, resulting in increased vehicle density and higher road carrying capacity. A platoon of vehicles can be formed in which the lead vehicle uses an operator, but the following vehicles behind the lead vehicle can be partially or fully automated. In this way, the operator can be entrusted with the safe operation of the platoon and the following vehicles may not require drivers. An important aspect in the continual adoption and growth of autonomous vehicle (including, but not limited, to platoons) is the overall fuel management for trip optimization.

Accordingly, there is need for an improved technique and system that facilitates fuel management and vehicle service times for a variety of vehicle types through determining the remaining trip range for a vehicle and providing optimal routing and refueling options for a trip route.

SUMMARY OF THE INVENTION

The present invention is directed to providing a system and method that facilitates optimizing fuel management and vehicle service times for a variety of vehicle types through determining the remaining trip range for a vehicle and providing optimal routing and vehicle fueling options for a trip route.

In a first implementation of the invention, a method that facilitates optimizing fuel management and vehicle service times for a variety of vehicle types through determining the remaining trip range for a vehicle and providing optimal routing and vehicle fueling options for a trip route. The method comprising:

initializing, by an artificial intelligence fuel management device associated with a particular one vehicle of a plurality of vehicles, a vehicle state and confirming a vehicle weight for the particular one vehicle, wherein each vehicle of the plurality of vehicles is fueled by at least one of a liquid fuel and an alternative fuel, and wherein the liquid fuel is one of gasoline and diesel, and the alternative fuel is one of electricity, bio-fuel, bio-alcohol, synthetic and paraffinic, steam, heat, vegetable and waste-derived oils, compressed air, liquid nitrogen, liquid petroleum gas, propane, hydrogen, ethanol, methanol, butanol, and natural gas;

determining, by the artificial intelligence fuel management device associated with the particular one vehicle of the plurality of vehicles, a present geographical position of the particular one vehicle;

applying, by the artificial intelligence fuel management device associated with the particular one vehicle of the plurality of vehicles, a present position fuel management condition for determining whether a refueling of the particular one vehicle is currently needed, and if the present position fuel management condition applied is indicative that the refueling is necessary then redirecting the particular one vehicle from the present geographical position determined to a particular one refueling station of a plurality of refueling stations that is most proximate to the particular one vehicle for the refueling thereof;

receiving, by the artificial intelligence fuel management device associated with the particular one vehicle of the plurality of vehicles, a trip route for the particular one vehicle, the trip route received comprising one of a single destination route and a multi-destination route, wherein the single destination route comprises at least a pick-up location and a final destination location, and the multi-destination route comprises at least the pick-up location, the final destination location and at least one other destination location between the pick-up location and the final destination;

determining, by the artificial intelligence fuel management device associated with the particular one vehicle of the plurality of vehicles, if the trip route received is either the single destination route or the multi-destination route, and in the event of the single destination route determination:
  applying, by the artificial intelligence fuel management device associated with the particular one vehicle of the plurality of vehicles, a single destination route fuel management condition for determining whether the refueling of the particular one vehicle is currently needed before embarking on the trip route received, and if the single destination route fuel management condition applied is indicative that the refueling is necessary then redirecting, prior to initiating the trip route to the pick-up location, the particular one vehicle from the present geographical position determined to the particular one refueling station of the plurality of refueling stations that is most proximate to the particular one vehicle for the refueling, otherwise if the single destination route fuel management condition applied is indicative that the refueling is not necessary then completing the trip route received by the particular one vehicle and monitoring a plurality of real-time vehicle parameters during the completion thereof;

in the event of the multi-destination route determination:
  applying, by the artificial intelligence fuel management device associated with the particular one vehicle of the plurality of vehicles, a multi-destination route fuel management condition for determining whether the refueling of the particular one vehicle is currently needed before embarking on the trip route, and if the multi-destination route fuel management condition applied is indicative that the refueling is necessary then redirecting, prior to initiating trip route to the pick-up location, the particular one vehicle from the present geographical position determined to the particular one refueling station of the plurality of refueling stations that is most proximate to the particular one vehicle for the refueling, otherwise if the multi-destination route fuel management condition applied is indicative that the refueling is not necessary then completing the trip route received by the particular one vehicle and monitoring the plurality of real-time vehicle parameters during the completion thereof; and determining, by the artificial intelligence fuel management device associated with the particular one vehicle of the plurality of vehicles, whether the particular one vehicle is currently in use on any trip route and if not currently in use and at an idling location, then applying a top-off fuel management condition for determining whether a top-off refueling of the particular one vehicle is currently needed to bring a current fuel level of the particular one vehicle equal to a maximum fuel tank capacity level of a fuel tank of the particular one vehicle, and if the top-off fuel management condition applied is indicative that the refueling is necessary then redirecting the particular one vehicle from the idling location to the particular one refueling station of the plurality of refueling stations that is most proximate to the particular one vehicle for the refueling, otherwise if the top-off fuel management condition applied is indicative that the refueling is not necessary then remaining at the idling location and monitoring the plurality of real-time vehicle parameters.

In a second aspect of the invention, an artificial intelligence fuel management device that facilitates optimizing fuel management and vehicle service times for a variety of vehicle types through determining the remaining trip range for a vehicle and providing optimal routing and vehicle fueling options for a trip route. The artificial intelligence fuel management device configured for installation within a particular vehicle and comprising at least a processor and a memory storing instructions that when executed cause the processor to perform operations comprising:

initializing, by the artificial intelligence fuel management device associated with a particular one vehicle of a plurality of vehicles, a vehicle state and confirming a vehicle weight for the particular one vehicle, wherein each vehicle of the plurality of vehicles is fueled by at least one of a liquid fuel and an alternative fuel, and wherein the liquid fuel is one of gasoline and diesel, and the alternative fuel is one of electricity, bio-fuel, bio-alcohol, synthetic and paraffinic, steam, heat, vegetable and waste-derived oils, compressed air, liquid nitrogen, liquid petroleum gas, propane, hydrogen, ethanol, methanol, butanol, and natural gas;

determining, by the artificial intelligence fuel management device associated with the particular one vehicle of the plurality of vehicles, a present geographical position of the particular one vehicle;

applying, by the artificial intelligence fuel management device associated with the particular one vehicle of the plurality of vehicles, a present position fuel management condition for determining whether a refueling of the particular one vehicle is currently needed, and if the present position fuel management condition applied is indicative that the refueling is necessary then redirecting the particular one vehicle from the present geographical position determined to a particular one refueling station of a plurality of refueling stations that is most proximate to the particular one vehicle for the refueling thereof;

receiving, by the artificial intelligence fuel management device associated with the particular one vehicle of the plurality of vehicles, a trip route for the particular one vehicle, the trip route received comprising one of a single destination route and a multi-destination route, wherein the single destination route comprises at least a pick-up location and a final destination location, and the multi-destination route comprises at least the pick-up location, the final destination location and at least one other destination location between the pick-up location and the final destination;

determining, by the artificial intelligence fuel management device associated with the particular one vehicle of the plurality of vehicles, if the trip route received is either the single destination route or the multi-destination route, and in the event of the single destination route determination:

applying, by the artificial intelligence fuel management device associated with the particular one vehicle of the plurality of vehicles, a single destination route fuel management condition for determining whether the refueling of the particular one vehicle is currently needed before embarking on the trip route received, and if the single destination route fuel management condition applied is indicative that the refueling is necessary then redirecting, prior to initiating the trip route to the pick-up location, the particular one vehicle from the present geographical position determined to the particular one refueling station of the plurality of refueling stations that is most proximate to the particular one vehicle for the refueling, otherwise if the single destination route fuel management condition applied is indicative that the refueling is not necessary then completing the trip route received by the particular one vehicle and monitoring a plurality of real-time vehicle parameters during the completion thereof;

in the event of the multi-destination route determination:

applying, by the artificial intelligence fuel management device associated with the particular one vehicle of the plurality of vehicles, a multi-destination route fuel management condition for determining whether the refueling of the particular one vehicle is currently needed before embarking on the trip route, and if the multi-destination route fuel management condition applied is indicative that the refueling is necessary then redirecting, prior to initiating trip route to the pick-up location, the particular one vehicle from the present geographical position determined to the particular one refueling station of the plurality of refueling stations that is most proximate to the particular one vehicle for the refueling, otherwise if the multi-destination route fuel management condition applied is indicative that the refueling is not necessary then completing the trip route received by the particular one vehicle and monitoring the plurality of real-time vehicle parameters during the completion thereof; and determining, by the artificial intelligence fuel management device associated with the particular one vehicle of the plurality of vehicles, whether the particular one vehicle is currently in use on any trip route and if not currently in use and at an idling location, then applying a top-off fuel management condition for determining whether a top-off refueling of the particular one vehicle is currently needed to bring a current fuel level of the particular one vehicle equal to a maximum fuel tank capacity level of a fuel tank of the particular one vehicle, and if the top-off fuel management condition applied is indicative that the refueling is necessary then redirecting the particular one vehicle from the idling location to the particular one refueling station of the plurality of refueling stations that is most proximate to the particular one vehicle for the refueling, otherwise if the top-off fuel management condition applied is indicative that the refueling is not necessary then remaining at the idling location and monitoring the plurality of real-time vehicle parameters.

In a third aspect of the invention, an artificial intelligence fuel management system is provided that facilitates optimizing fuel management and vehicle service times for a variety of vehicle types through determining the remaining trip range for a vehicle and providing optimal routing and vehicle fueling options for a trip route. The artificial intelligence fuel management system configured for communicating and operating with the artificial intelligence fuel management device installed within a particular vehicle. The system comprising at least a processor and a memory storing instructions that when executed cause the processor to perform operations comprising:

initializing, by an artificial intelligence fuel management device associated with a particular one vehicle of a plurality of vehicles, a vehicle state and confirming a vehicle weight for the particular one vehicle, wherein each vehicle of the plurality of vehicles is fueled by at least one of a liquid fuel and an alternative fuel, and wherein the liquid fuel is one of gasoline and diesel, and the alternative fuel is one of electricity, bio-fuel, bio-alcohol, synthetic and paraffinic, steam, heat, vegetable and waste-derived oils, compressed air, liquid nitrogen, liquid petroleum gas, propane, hydrogen, ethanol, methanol, butanol, and natural gas;

determining, by the artificial intelligence fuel management device associated with the particular one vehicle of the plurality of vehicles, a present geographical position of the particular one vehicle;

receiving, by the artificial intelligence fuel management system, from the artificial intelligence fuel management device associated with the particular one vehicle of the plurality of vehicles the present geographical position determined of the particular one vehicle and vehicle state initialized and the vehicle weight confirmed;

applying, by the artificial intelligence fuel management device associated with the particular one vehicle of the plurality of vehicles, in communication with the artificial intelligence fuel management system, a present position fuel management condition for determining whether a refueling of the particular one vehicle is currently needed, and if the present position fuel management condition applied is indicative that the refueling is necessary then redirecting the particular one vehicle from the present geographical position determined to a particular one refueling station of a plurality of refueling stations that is most proximate to the particular one vehicle for the refueling thereof;

receiving, by the artificial intelligence fuel management device associated with the particular one vehicle of the plurality of vehicles, in communication with the artificial intelligence fuel management system, a trip route for the particular one vehicle, the trip route received comprising one of a single destination route and a multi-destination route, wherein the single destination route comprises at least a pick-up location and a final destination location, and the multi-destination route comprises at least the pick-up location, the final destination location and at least one other destination location between the pick-up location and the final destination;

determining, by the artificial intelligence fuel management device associated with the particular one vehicle of the plurality of vehicles, in communication with the artificial intelligence fuel management system, if the trip route received is either the single destination route or the multi-destination route, and in the event of the single destination route determination:

applying, by the artificial intelligence fuel management device associated with the particular one vehicle of the plurality of vehicles, in communication with the artificial intelligence fuel management system, a single destination route fuel management condition for determining whether the refueling of the particular one vehicle is currently needed before embarking on the trip route received, and if the single destination route fuel management condition applied is indicative that the refueling is necessary then redirecting, prior to initiating the trip route to the pick-up location, the particular one vehicle from the present geographical position determined to the particular one refueling station of the plurality of refueling stations that is most proximate to the particular one vehicle for the refueling, otherwise if the single destination route fuel management condition applied is indicative that the refueling is not necessary then completing the trip route received by the particular one vehicle and monitoring a plurality of real-time vehicle parameters during the completion thereof;

in the event of the multi-destination route determination:

applying, by the artificial intelligence fuel management device associated with the particular one vehicle of the plurality of vehicles, in communication with the artificial intelligence fuel management system, a multi-destination route fuel management condition for determining whether the refueling of the particular one vehicle is currently needed before embarking on the trip route, and if the multi-destination route fuel management condition applied is indicative that the refueling is necessary then redirecting, prior to initiating trip route to the pick-up location, the particular one vehicle from the present geographical position determined to the particular one refueling station of the plurality of refueling stations that is most proximate to the particular one vehicle for the refueling, otherwise if the multi-destination route fuel management condition applied is indicative that the refueling is not necessary then completing the trip route received by the particular one vehicle and monitoring the plurality of real-time vehicle parameters during the completion thereof, and determining, by the artificial intelligence fuel management device associated with the particular one vehicle of the plurality of vehicles, in communication with the artificial intelligence fuel management system, whether the particular one vehicle is currently in use on any trip route and if not currently in use and at an idling location, then applying a top-off fuel management condition for determining whether a top-off refueling of the particular one vehicle is currently needed to bring a current fuel level of the particular one vehicle equal to a maximum fuel tank capacity level of a fuel tank of the particular one vehicle, and if the top-off fuel management condition applied is indicative that the refueling is necessary then redirecting the particular one vehicle from the idling location to the particular one refueling station of the plurality of refueling stations that is most proximate to the particular one vehicle for the refueling, otherwise if the top-off fuel management condition applied is indicative that the refueling is not necessary then remaining at the idling location and monitoring the plurality of real-time vehicle parameters.

In a fourth aspect, a digital content artificial intelligence (AI) fuel management application (alternatively referred to herein as an "app") is provided for optimizing fuel management and vehicle service times for a variety of vehicle types through determining the remaining trip range for a vehicle and providing optimal routing and vehicle fueling options for a trip route. The application comprising operations for:

initializing a vehicle state and confirming a vehicle weight for the particular one vehicle, wherein each vehicle of the plurality of vehicles is fueled by at least one of a liquid fuel and an alternative fuel, and wherein the liquid fuel is one of gasoline and diesel, and the alternative fuel is one of electricity, bio-fuel, bio-alcohol, synthetic and paraffinic, steam, heat, vegetable and waste-derived oils, compressed air, liquid nitrogen, liquid petroleum gas, propane, hydrogen, ethanol, methanol, butanol, and natural gas;

determining a present geographical position of the particular one vehicle;

applying a present position fuel management condition for determining whether a refueling of the particular one vehicle is currently needed, and if the present position fuel management condition applied is indicative that the refueling is necessary then redirecting the particular one vehicle from the present geographical position determined to a particular one refueling station of a plurality of refueling stations that is most proximate to the particular one vehicle for the refueling thereof;

receiving a trip route for the particular one vehicle, the trip route received comprising one of a single destination route and a multi-destination route, wherein the single destination route comprises at least a pick-up location and a final destination location, and the multi-destination route comprises at least the pick-up location, the final destination location and at least one other destination location between the pick-up location and the final destination;

determining if the trip route received is either the single destination route or the multi-destination route, and
in the event of the single destination route determination:
applying a single destination route fuel management condition for determining whether the refueling of the particular one vehicle is currently needed before embarking on the trip route received, and if the single destination route fuel management condition applied is indicative that the refueling is necessary then redirecting, prior to initiating the trip route to the pick-up location, the particular one vehicle from the present geographical position determined to the particular one refueling station of the plurality of refueling stations that is most proximate to the particular one vehicle for the refueling, otherwise if the single destination route fuel management condition applied is indicative that the refueling is not necessary then completing the trip route received by the particular one vehicle and monitoring a plurality of real-time vehicle parameters during the completion thereof;
in the event of the multi-destination route determination:
applying a multi-destination route fuel management condition for determining whether the refueling of the particular one vehicle is currently needed before embarking on the trip route, and if the multi-destination route fuel management condition applied is indicative that the refueling is necessary then redirecting, prior to initiating trip route to the pick-up location, the particular one vehicle from the present geographical position determined to the particular one refueling station of the plurality of refueling stations that is most proximate to the particular one vehicle for the refueling, otherwise if the multi-destination route fuel management condition applied is indicative that the refueling is not necessary then completing the trip route received by the particular one vehicle and monitoring the plurality of real-time vehicle parameters during the completion thereof; and
determining whether the particular one vehicle is currently in use on any trip route and if not currently in use and at an idling location, then applying a top-off fuel management condition for determining whether a top-off refueling of the particular one vehicle is currently needed to bring a current fuel level of the particular one vehicle equal to a maximum fuel tank capacity level of a fuel tank of the particular one vehicle, and if the top-off fuel management condition applied is indicative that the refueling is necessary then redirecting the particular one vehicle from the idling location to the particular one refueling station of the plurality of refueling stations that is most proximate to the particular one vehicle for the refueling, otherwise if the top-off fuel management condition applied is indicative that the refueling is not necessary then remaining at the idling location and monitoring the plurality of real-time vehicle parameters.

In another aspect, one or more vehicles is a hybrid-electric vehicle.

In another aspect, the plurality of real-time vehicle parameters monitored is performed at a minimum interval of one (1) minute during the particular one vehicle's operation.

In another aspect, each vehicle of the plurality of vehicles is an autonomous vehicle.

In another aspect, there is determining the particular one refueling station of the plurality of refueling stations that is most proximate to the particular one vehicle for the refueling thereof.

In another aspect, the particular one refueling station of the plurality of the plurality of refueling stations is an automated fueling station.

In another aspect, the automated fueling station is configured for robotic fueling of the particular one vehicle.

In another aspect, there is transmitting a refueling appointment request to the automated fueling station and an estimated time of arrival to the automated fueling station by the particular one vehicle, remitting upon completion of the refueling of the particular one vehicle, by the artificial intelligence fuel management device associated with the particular one vehicle of the plurality of vehicles, a payment for the refueling thereof, and receiving, by the artificial intelligence fuel management device associated with the particular one vehicle of the plurality of vehicles, a notification that the particular one vehicle may safely exit the automated fueling station.

In another aspect, the plurality of real-time vehicle parameters monitored comprise at least a vehicle endurance, a vehicle trip range, a vehicle engine operational current state, and total operational power requirements.

In another aspect, there is transmitting the plurality of real-time vehicle parameters monitored to an artificial intelligence fuel management system that is providing fuel management to the plurality of vehicles.

In another aspect, there is receiving real-time trip information comprising at least current traffic conditions and current weather conditions along the trip route received.

In another aspect, the present position fuel management condition applied is given by:
if
(i) available vehicle range at a current fuel level for the particular one vehicle and the vehicle weight confirmed therefore is equal to or less than (<=) thirty percent (30%) of a full fuel level range for the particular one vehicle; and
(ii) available vehicle endurance at the current fuel level for the particular one vehicle and the vehicle weight confirmed therefore is equal to or less than (<=) two (2) hours of vehicle endurance, wherein the vehicle endurance is measured as a function fuel needed to power the particular one vehicle's heating system, air conditioning system and total operational power requirements of the particular one vehicle;
then the refueling is necessary.

In another aspect, the single destination route fuel management condition is given by:
if (an available vehicle range and endurance at a current fuel level of the particular one vehicle and the vehicle weight confirmed therefore)–(a necessary vehicle range and vehicle endurance to complete, at the vehicle weight confirmed therefore, the single destination route) is:
(i) less than or equal to (<=) thirty (30%) of a full fuel level range for the particular one vehicle at the vehicle weight confirmed therefore; or
(ii) less than or equal to (<=) two (2) hours of vehicle endurance, wherein the vehicle endurance is measured as a function fuel needed to power the particular one vehicle's heating system, air conditioning system and total operational power requirements of the particular one vehicle;
then the refueling is necessary.

In another aspect, the multi-destination route fuel management condition applied is given by:
if (an available vehicle range and endurance at a current fuel level of the particular one vehicle and the vehicle weight confirmed therefore)–(necessary vehicle range and vehicle endurance to complete, at the vehicle weight confirmed therefore, the multi-destination route) is:
(i) less than or equal to (<=) twenty-five (25%) of a full fuel level vehicle range for the particular one vehicle at the vehicle weight confirmed therefore; or
(ii) less than or equal to (<=) two (2) hours of vehicle endurance, wherein the vehicle endurance is measured as a function fuel needed to power the particular one vehicle's heating system, air conditioning system and total operational power requirements of the particular one vehicle;
then the refueling is necessary.

In another aspect, the top-off fuel management condition applied is defined by:
if
(i) an available vehicle range at a current fuel level for the particular one vehicle and the vehicle weight confirmed therefore is less than or equal to (<=) seventy percent (70%) of a full fuel level vehicle range for the particular one vehicle at the vehicle weight confirmed therefore; and
(ii) the present geographical position of the particular one vehicle is less than or equal to (<=) five hundred (500) meters from the particular one refueling station of the plurality of refueling stations that is most proximate to the particular one vehicle:
then the refueling is necessary.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in the figures herein. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward an artificial intelligence fuel management system and method that facilitates optimizing fuel management and vehicle service times for a variety of vehicle types through determining the remaining trip range for a vehicle and providing optimal routing and vehicle fueling options for a trip route. Importantly, the artificial intelligence fuel management system and method of the disclosed embodiments provides an advantageous improvement of practical applications such as autonomous vehicles, vehicle platoon management, vehicular fuel management systems and vehicular computer controls and hardware. Fuel management problems are solved, through an efficient fuel management system and method, that are associated with autonomous vehicles and/or any other type of vehicle that is fueled by at least one of a liquid fuel and an alternative fuel, and wherein the liquid fuel is one of gasoline and diesel, and the alternative fuel is one of electricity, bio-fuel, bio-alcohol, synthetic and paraffinic, steam, heat, vegetable and waste-derived oils, compressed air, liquid nitrogen, liquid petroleum gas, propane, hydrogen, ethanol, methanol, butanol, and natural gas.

Figure 1A:
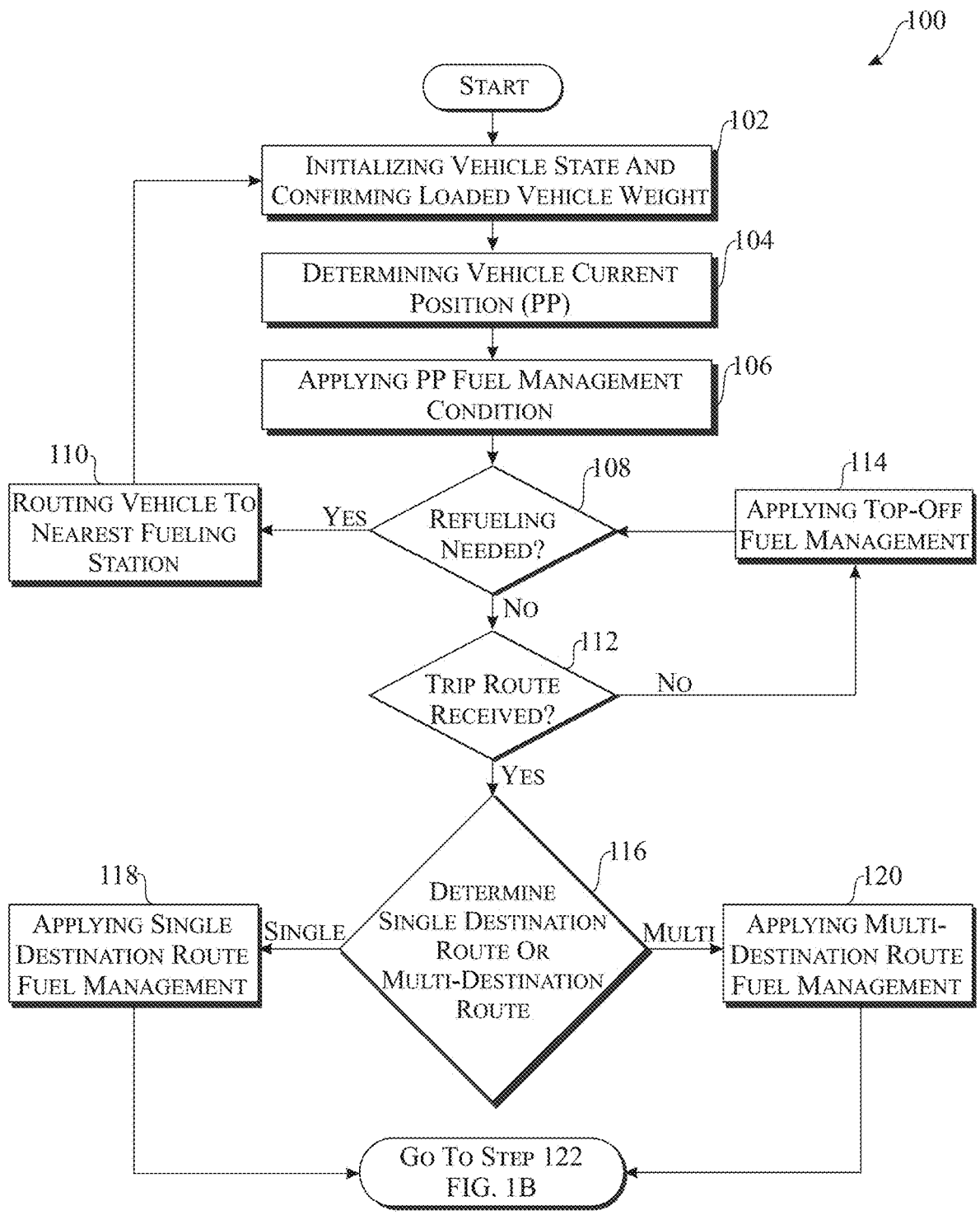
FIGS. 1A and 1B present a flowchart of illustrative operations for optimizing fuel management and providing optimal routing and vehicle fueling options for a trip route in accordance with an embodiment.
Figure 1B:
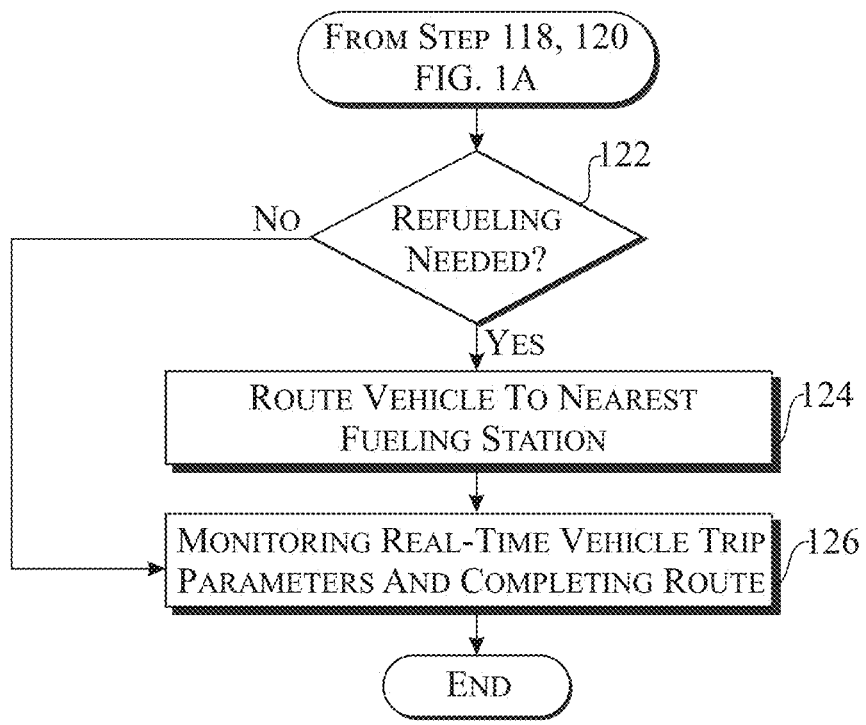

Turning our attention to FIGS. 1A and 1B, a flowchart of illustrative operations 100 for optimizing fuel management and providing optimal routing and vehicle fueling options for a trip route in accordance with an embodiment. More particularly, at step 102, initializing a vehicle state and confirming a vehicle weight for the particular one vehicle. This initial vehicle state serves to ensure the current state of the subject vehicle is identified and the subject vehicle's weight is confirmed and known. This initial dataset will be necessary in order to effectively predict and manage the vehicle's fuel requirements in view of a particular trip route to be undertaken, as will be further detailed herein below. In accordance with the principles of the disclosed embodiments each vehicle of the plurality of vehicles is fueled by at least one of a liquid fuel and an alternative fuel, and wherein the liquid fuel is one of gasoline and diesel, and the alternative fuel is one of electricity, bio-fuel, bio-alcohol, synthetic and paraffinic, steam, heat, vegetable and waste-derived oils, compressed air, liquid nitrogen, liquid petroleum gas, propane, hydrogen, ethanol, methanol, butanol, and natural gas. At step 104, determining a present geographical position of the particular one vehicle and applying, at step 106, a present position fuel management condition for determining, at step 108, whether a refueling of the particular one vehicle is currently needed, and if the present position fuel management condition applied is indicative that the refueling is necessary then, at step 110, redirecting the particular one vehicle from the present geographical position determined to a particular one refueling station of a plurality of refueling stations that is most proximate to the particular one vehicle for the refueling thereof. In this way, a determination is made, before undertaking any particular trip route and at the vehicle's current location and vehicle state, as to whether the vehicle has an adequate amount of fuel. The adequacy of the fuel amount is determined, in accordance with the principles of the disclosed embodiments, as a function of at least the vehicle's available range (in terms of distance) and vehicle endurance. As used herein, "vehicle endurance" means endurance measured as a function of the fuel needed to power a vehicle's heating system, air conditioning system and total operational power requirements of the particular one vehicle (i.e., the total vehicle power requirements inclusive of power requirements attributable to the vehicle/s passenger(s) and/or cargo).

If no refueling is presently needed, determining, at step 112, whether a trip route has been received. If no trip has been received, this signifies that the particular vehicle is not currently in use and/or at an idling location, such that there is the applying of a top-off fuel management condition, at step 114, for determining whether a top-off refueling of the particular one vehicle is currently needed to bring a current fuel level of the particular one vehicle equal to a maximum fuel tank capacity level of a fuel tank of the particular one vehicle. That is, as will be understood, each vehicle in any plurality of vehicles will have a specific fuel tank configuration and maximum fuel capacity. Thus, at step 114, a fuel check is made as to whether there is a current need to "top-off" the fuel tank from a current level to the maximum fuel tank capacity. Advantageously, this reduces the deleterious effects of so-called "dead miles" in the event the vehicle is being operated as a revenue-generating type vehicle (e.g., a ride sharing service, public transportation, etc.). Dead miles/mileage (also known as dead running or dead heading) is when a revenue-generating vehicle operates without carrying or accepting passengers, such as when coming from a garage to begin the vehicle's first trip of the day. In this way, if the top-off fuel management condition applied, at step 108, is indicative that the refueling is necessary then redirecting the particular one vehicle from the idling location to a particular one refueling station of a plurality of refueling stations that is most proximate to the particular one vehicle for the refueling. Otherwise, if the top-off fuel management condition applied is indicative that the refueling is not necessary then remaining at the idling location and monitoring the plurality of real-time vehicle parameters of the vehicle.

Figure 6:
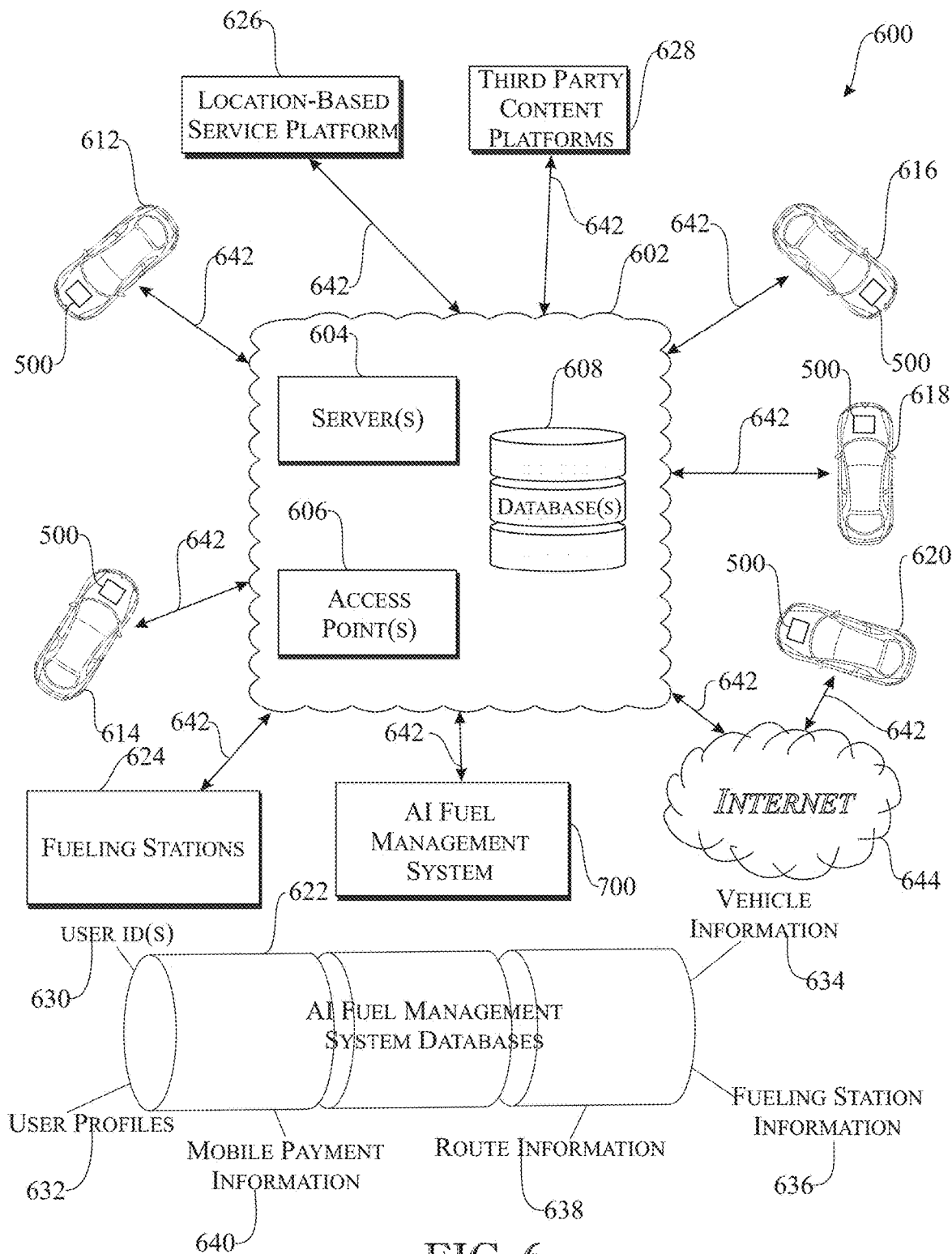
FIG. 6 presents a high-level block diagram of a cloud network services architecture for facilitating optimizing fuel management for a vehicle(s) and providing optimal routing and vehicle fueling options for a trip route in accordance with an embodiment.

Of course, the refueling station will be matched with the fuel type associated with the particular vehicle. That is, the refueling station be dispensing either a liquid fuel (i.e., gasoline and diesel) and/or an alternative fuel (i.e., electricity, bio-fuel, bio-alcohol, synthetic and paraffinic, steam, heat, vegetable and waste-derived oils, compressed air, liquid nitrogen, liquid petroleum gas, propane, hydrogen, ethanol, methanol, butanol, and natural gas). Further, in an embodiment, one or more of the fuel stations available to execute the vehicle refueling one may be an automated fueling station. In this context, an automated fueling or robotic fueling involves the use of automation to remove human labor from the fueling process. This machine-to-machine fueling (e.g., using the fueling stations 624 as shown in FIG. 6) is enabled for any type of vehicle including, but not limited, to autonomous and self-driving vehicles. The fueling is performed by a robotic arm, for example, which opens the car's fuel flap, unscrews the cap, picks up the fuel nozzle and inserts the nozzle into the tank opening for refueling the vehicle. Typically, the robotic refueling will employ a vision sensing and detection system(s) to help guide the nozzle to the vehicle's fuel tank opening.

If a trip route has been received, determining, at step 116, if the trip route received is either the single destination route or the multi-destination route. As used herein, a "single destination route" comprises at least a pick-up location and a final destination location for the trip route to be undertaken and completed by the vehicle, and a "multi-destination route" comprises at least the pick-up location, the final destination location and at least one other destination location between the pick-up location and the final destination for the trip route to be undertaken and completed by the vehicle in the event of the single destination route determination.

If a single destination route has been received, applying, at step 118, a single destination route fuel management condition for determining whether the refueling of the particular one vehicle is currently needed before embarking on the trip route received, and if the single destination route fuel management condition applied is indicative, at step 122, that the refueling is necessary then redirecting, prior to initiating the trip route to the pick-up location, the particular one vehicle from the present geographical position determined to the particular one refueling station of the plurality of refueling stations that is most proximate (e.g., one (1)

kilometer) to the particular one vehicle for the refueling, at step 124. Otherwise, if the single destination route fuel management condition applied is indicative that the refueling is not necessary then completing the trip route received by the particular one vehicle and monitoring, at step 126, a plurality of real-time vehicle parameters during the completion thereof. If a multi-destination route has been received, at step 120, applying a multi-destination route fuel management condition for determining whether the refueling of the particular one vehicle is currently needed before embarking on the trip route, and if the multi-destination route fuel management condition applied is indicative, at step 122, that the refueling is necessary then redirecting, prior to initiating trip route to the pick-up location, the particular one vehicle from the present geographical position determined to the particular one refueling station of the plurality of refueling stations that is most proximate to the particular one vehicle for the refueling, at step 124. Otherwise, if the multi-destination route fuel management condition applied is indicative that the refueling is not necessary then completing the trip route received by the particular one vehicle and monitoring, at step 126, the plurality of real-time vehicle parameters during the completion thereof.

Figure 2A:
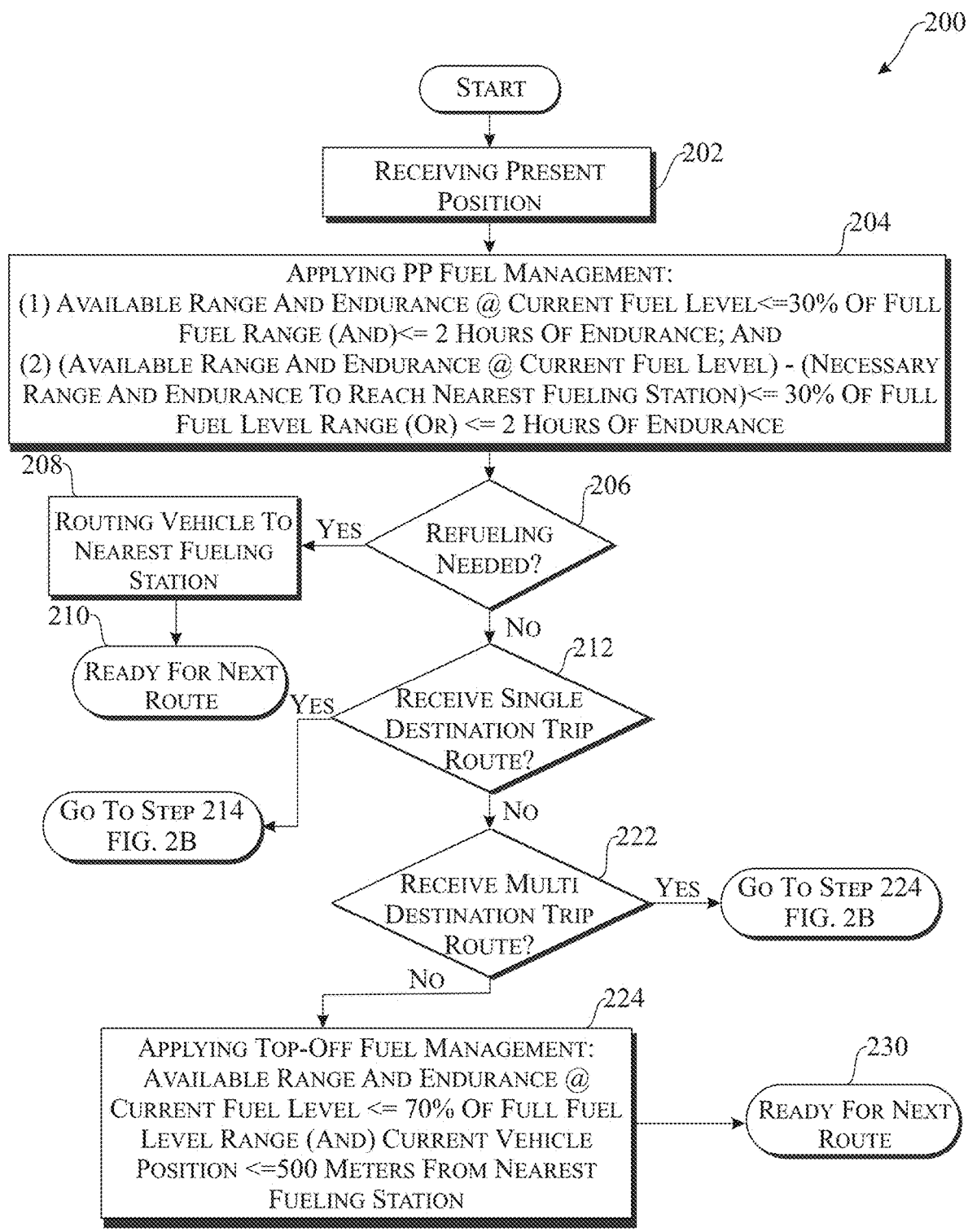
FIGS. 2A and 2B present a flowchart of illustrative operations for optimizing fuel management and providing optimal routing and vehicle fueling options for a trip route applying specific conditions for: present position fuel management, single destination route fuel management, multi-destination route fuel management, and top-off fuel management in accordance with an embodiment.
Figure 2B:
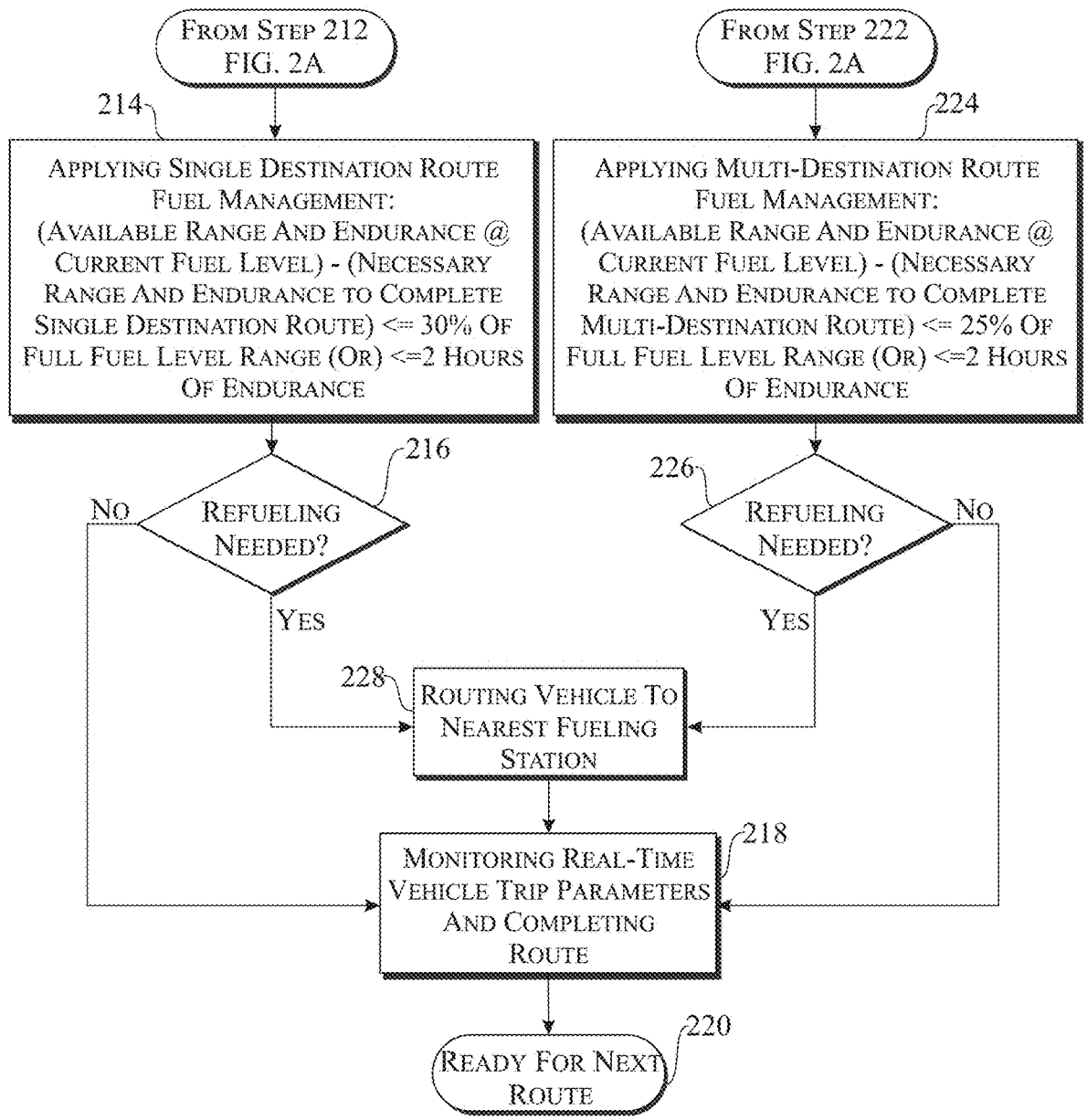

Continuing with the above operational details, FIGS. 2A and 2B presents a flowchart of illustrative operations 200 for optimizing fuel management and providing optimal routing and vehicle fueling options for a trip route applying specific conditions for: present position fuel management, single destination route fuel management, multi-destination route fuel management, and top-off fuel management in accordance with an embodiment. More particularly, at step 202, receiving a present geographical position of the particular one vehicle. To be clear, the aforementioned vehicle state initialization and vehicle weight confirmation have been completed as well. Further, as will be detailed further herein below, the various operations for optimizing fuel management and providing optimal routing and vehicle fueling options for a trip route are illustratively performed by an artificial intelligence fuel management device 500 (see, FIG. 5) associated with any one vehicle of the plurality of vehicles that is in communication with an artificial fuel management system 700 (see, FIG. 7) in accordance with the principles of the disclosed embodiments. At step 204, applying, by the artificial intelligence fuel management device 500 associated with the particular one vehicle of the plurality of vehicles, for example, a present position fuel management condition for determining, at step 206, whether a refueling of the particular one vehicle is currently needed. In accordance with the embodiment, the present position fuel management condition applied at step 204 is given by:
If (i) available vehicle range at a current fuel level for the particular one vehicle and the vehicle weight confirmed therefore is equal to or less than (<=) thirty percent (30%) of a full fuel level range for the particular one vehicle; and
(ii) available vehicle endurance at the current fuel level for the particular one vehicle and the vehicle weight confirmed therefore is equal to or less than (<=) two (2) hours of vehicle endurance, wherein the vehicle endurance is measured as a function of fuel needed to power the particular one vehicle's heating system, air conditioning system and total operational power requirements of the particular one vehicle;
then the refueling is necessary.
In this way, a determination is made, before undertaking any particular trip route and at the vehicle's current location and vehicle state, as to whether the vehicle has an adequate amount of fuel. The adequacy of the fuel amount is determined, in accordance with the principles of the disclosed embodiments, as a function of at least the vehicle's available range (in terms of distance) and vehicle endurance. If the present position fuel management condition applied is indicative that the refueling is necessary then, at step 208, routing and redirecting the particular one vehicle from the present geographical position determined to a particular one refueling station of a plurality of refueling stations that is most proximate to the particular one vehicle for the refueling thereof. Once refueling is completed, the vehicle is ready for the next route, at step 210.

If no refueling is presently needed, determining, at step 212, whether a single destination trip route has been received. If no single destination trip has been received, then determining, at step 222, if a multi-destination trip has been received. If neither a single destination or multi-destination trip has been received, this signifies that the particular vehicle is not currently in use and/or at an idling location, such that there is the applying of a top-off fuel management condition, at step 224, for determining whether a top-off refueling of the particular one vehicle is currently needed to bring a current fuel level of the particular one vehicle equal to a maximum fuel tank capacity level of a fuel tank of the particular one vehicle. As previously noted, each vehicle in any plurality of vehicles will have a specific fuel tank configuration and maximum fuel capacity. Thus, at step 224, a fuel check is made as to whether there is a current need to "top-off" the fuel tank from a current level to the maximum fuel tank capacity. Advantageously, this reduces the deleterious effects of dead miles in the event the vehicle is being operated as a revenue-generating type vehicle (e.g., a ride sharing service, public transportation, etc.). In accordance with the embodiment, the present position fuel management condition applied is given by:
If (i) an available vehicle range at a current fuel level for the particular one vehicle and the vehicle weight confirmed therefore is less than or equal to (<=) seventy percent (70%) of a full fuel level vehicle range for the particular one vehicle at the vehicle weight confirmed therefore; and
(ii) the present geographical position of the particular one vehicle is less than or equal to (<=) five hundred (500) meters from the particular one refueling station of the plurality of refueling stations that is most proximate to the particular one vehicle;
then the refueling is necessary.
In this way, if the top-off fuel management condition applied, at step 224, is indicative that the refueling is necessary then redirecting the particular one vehicle from the idling location to a particular one refueling station of a plurality of refueling stations that is most proximate to the particular one vehicle for the refueling and the vehicle is ready for the next route, at step 230 and the current route operations end. Otherwise, if the top-off fuel management condition applied is indicative that the refueling is not necessary then remaining at the idling location and monitoring the plurality of real-time vehicle parameters of the vehicle.

However, if determined, at step 212, that a single destination route has been received, applying, at step 214, a single destination route fuel management condition for determining whether the refueling of the particular one vehicle is currently needed before embarking on the trip route received. In accordance with the embodiment, the single destination route fuel management condition applied is given by:

If (an available vehicle range and endurance at a current fuel level of the particular one vehicle and the vehicle weight confirmed therefore)–(a necessary vehicle range and vehicle endurance to complete, at the vehicle weight confirmed therefore, the single destination route) is:
  (i) less than or equal to (<=) thirty (30%) of a full fuel level range for the particular one vehicle at the vehicle weight confirmed therefore; or
  (ii) less than or equal to (<=) two (2) hours of vehicle endurance, wherein the vehicle endurance is measured as a function of fuel needed to power the particular one vehicle's heating system, air conditioning system and total operational power requirements of the particular one vehicle;
then the refueling is necessary.

However, if the single destination route fuel management condition applied is indicative, at steps 214 and 216, that the refueling is necessary then redirecting, prior to initiating the trip route to the pick-up location, at step 228, the particular one vehicle from the present geographical position determined to the particular one refueling station of the plurality of refueling stations that is most proximate to the particular one vehicle for the refueling. Upon completion of the refueling, or in the event the single destination route fuel management condition applied is indicative that the refueling is not necessary then, at step 218 completing the trip route received by the particular one vehicle and monitoring, a plurality of real-time vehicle parameters during the completion thereof. Upon trip completion, the vehicle is then ready for the next route, at step 220 and the current route operations end.

Otherwise, if determined, at step 222, that a multi-destination route has been received, applying, at step 224, a multi-destination route fuel management condition for determining whether the refueling of the particular one vehicle is currently needed before embarking on the trip route received. In accordance with the embodiment, the multi-destination route fuel management condition applied is given by:
  if (an available vehicle range and endurance at a current fuel level of the particular one vehicle and the vehicle weight confirmed therefore)–(necessary vehicle range and vehicle endurance to complete, at the vehicle weight confirmed therefore, the multi-destination route) is:
    (i) less than or equal to (<=) twenty-five (25%) of a full fuel level vehicle range for the particular one vehicle at the vehicle weight confirmed therefore; or
    (ii) less than or equal to (<=) two (2) hours of vehicle endurance, wherein the vehicle endurance is measured as a function of fuel needed to power the particular one vehicle's heating system, air conditioning system and total operational power requirements of the particular one vehicle;
  then the refueling is necessary.

Thus, if the multi-destination route fuel management condition applied is indicative, at steps 224 and 226, that the refueling is necessary then redirecting, prior to initiating the trip route to the pick-up location, at step 228, the particular one vehicle from the present geographical position determined to the particular one refueling station of the plurality of refueling stations that is most proximate to the particular one vehicle for the refueling. Upon completion of the refueling, or in the event the multi-destination route fuel management condition applied is indicative that the refueling is not necessary then, at step 218 completing the trip route received by the particular one vehicle and monitoring, a plurality of real-time vehicle parameters during the completion thereof. Upon trip completion, the vehicle is then ready for the next route, at step 220 and the current route operations end.

Figure 8:
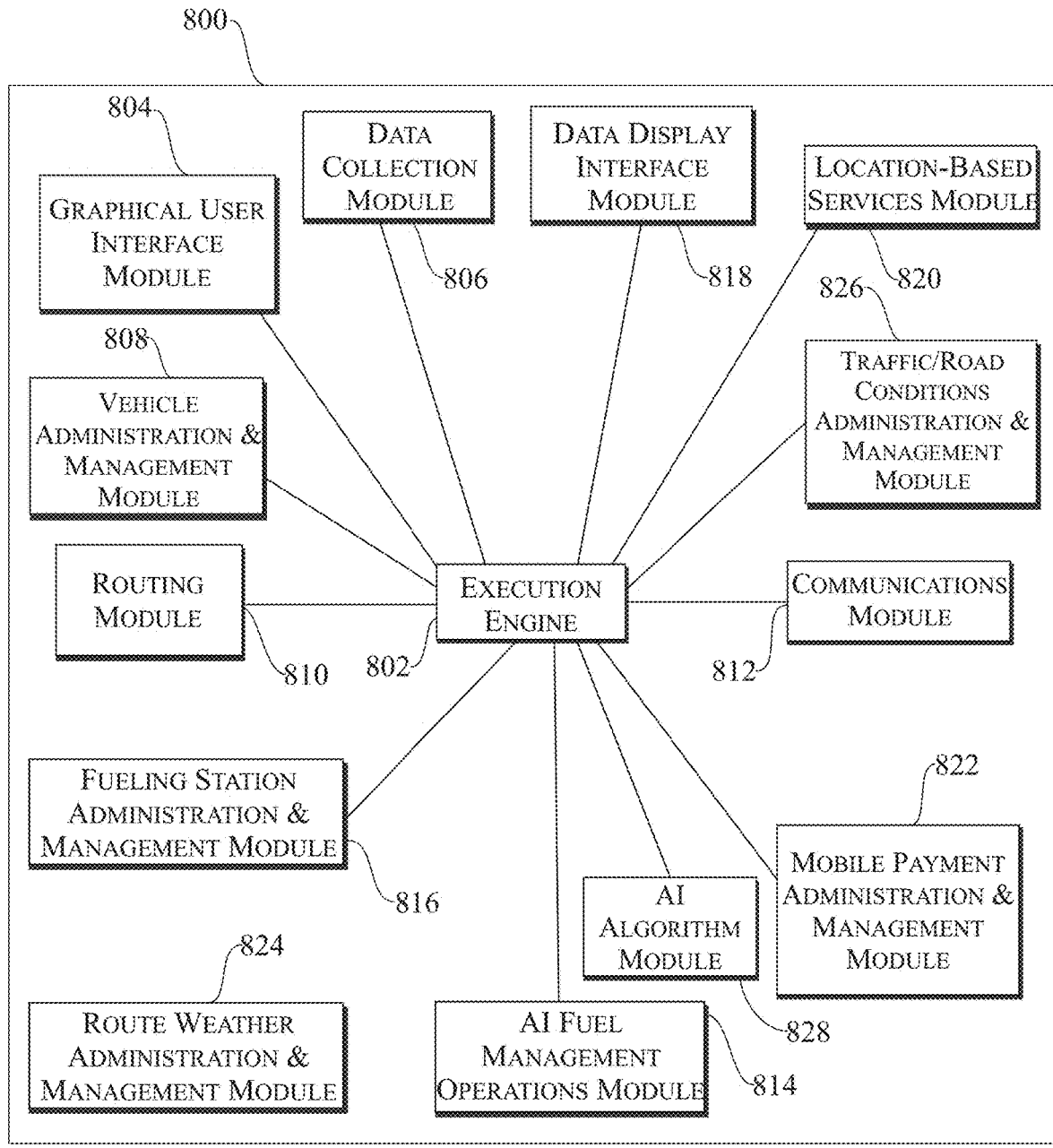
FIG. 8 presents an illustrative architecture for an artificial intelligence fuel management app in accordance with an embodiment.

As previously noted, the principles of the disclosed embodiments for optimizing fuel management and providing optimal routing and vehicle fueling options for a trip route are illustratively performed by an artificial intelligence fuel management device 500 associated with any one vehicle of the plurality of vehicles that is in communication with an artificial fuel management system 700. Further, in accordance with the principles of the disclosed embodiments, the vehicle(s) may be a hybrid-electric vehicle, other alternative fuel vehicle(s) (e.g., liquid propane), and/or an autonomous vehicle(s). As will be appreciated, Artificial intelligence (AI) refers to the simulation of human intelligence in machines that are programmed to think like humans and mimic their actions. The term may also be applied to any machine that exhibits traits associated with a human mind such as learning and problem-solving. As such, AI is intelligence demonstrated by machines, unlike the natural intelligence displayed by humans and animals, which involves consciousness and emotionality. Artificial intelligence is typically divided into two different categories: weak and strong. Weak artificial intelligence embodies a system designed to carry out one particular job. Weak AI systems include video games such as a chess gaming application and personal assistants such as Amazon's Alexa and Apple's Siri. Strong artificial intelligence systems are systems that carry on the tasks considered to be human-like. These tend to be more complex and complicated systems. They are programmed to handle situations in which they may be required to problem solve without having a person intervene. In AI there is a defined field of study directed to so-called "intelligent agents", that is, any device that perceives its environment and takes actions that maximize its chance of successfully achieving its goals. Colloquially, the term "artificial intelligence" is often used to describe machines that mimic "cognitive" functions that humans associate with the human mind, such as "learning" and "problem solving. The ideal characteristic of artificial intelligence is its ability to rationalize and take actions that have the best chance of achieving a specific goal. A subset of artificial intelligence is machine learning, which refers to the concept that computer programs can automatically learn from and adapt to new data without being assisted by humans. Deep learning techniques enable this automatic learning through the absorption of huge amounts of unstructured data such as text, images, or video. In accordance with the principles of the disclosed embodiments, any AI algorithm strong in predictive modeling may be employed (e.g., by and through the AI algorithm module 828 as shown in FIG. 8) in order to analyze the plurality of real-time vehicle parameters monitored and execution of the various operations for the refueling determination to be made, as detailed herein, in accordance with the applicable present position fuel management condition, single destination route fuel management condition, multi-destination route fuel management condition, and/or top-off fuel management condition and if refueling is necessary then identifying the most proximate fueling station for undertaking the necessary vehicle refueling. Such AI algorithms including, but not limited to, Linear Regression, Logistic Regression, Linear Discriminant Analysis, Classification and Regression Trees, Naive Bayes, K-Nearest Neighbors (KNN), Learning Vector Quantization (LVQ), Support Vector Machines (SVM), and Random Forest, to name just a few.

Figure 3:
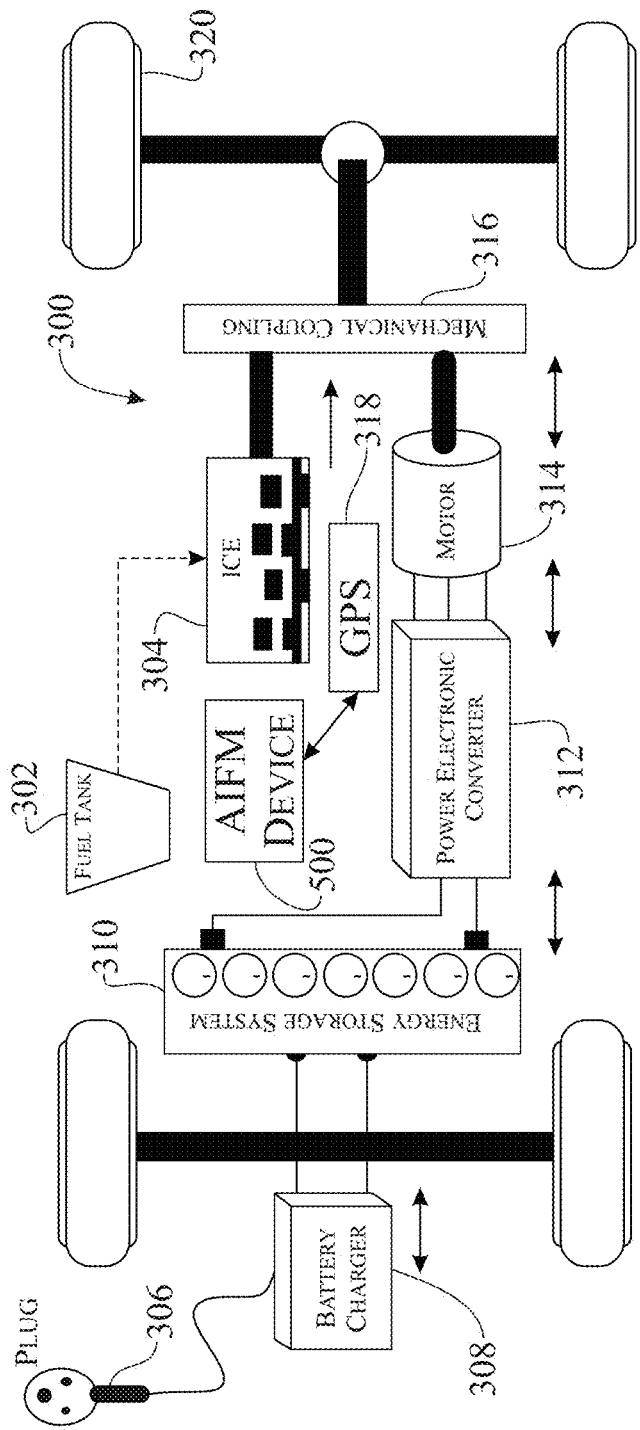
FIG. 3 presents an illustrative hybrid-electric vehicle configured with an artificial intelligence fuel management device in accordance with an embodiment.
Figure 4:
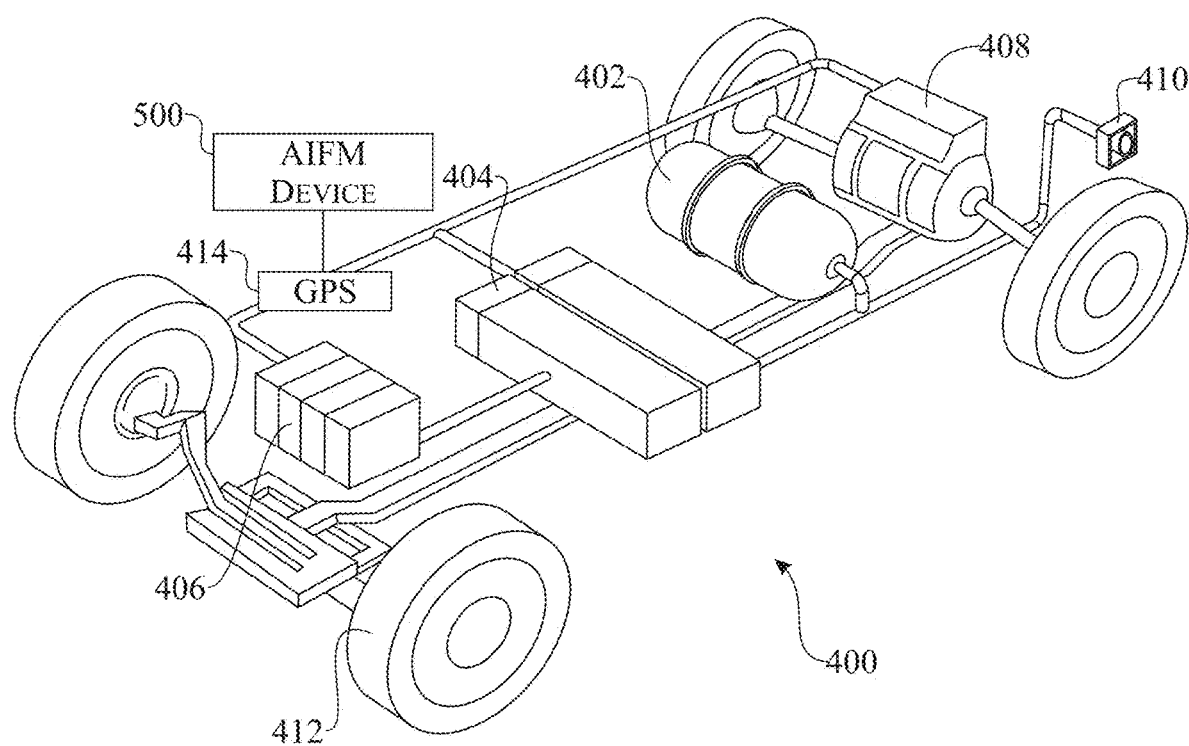
FIG. 4 presents an illustrative hydrogen fuel cell electrical vehicle configured with an artificial intelligence fuel management device in accordance with an embodiment.
Figure 5:
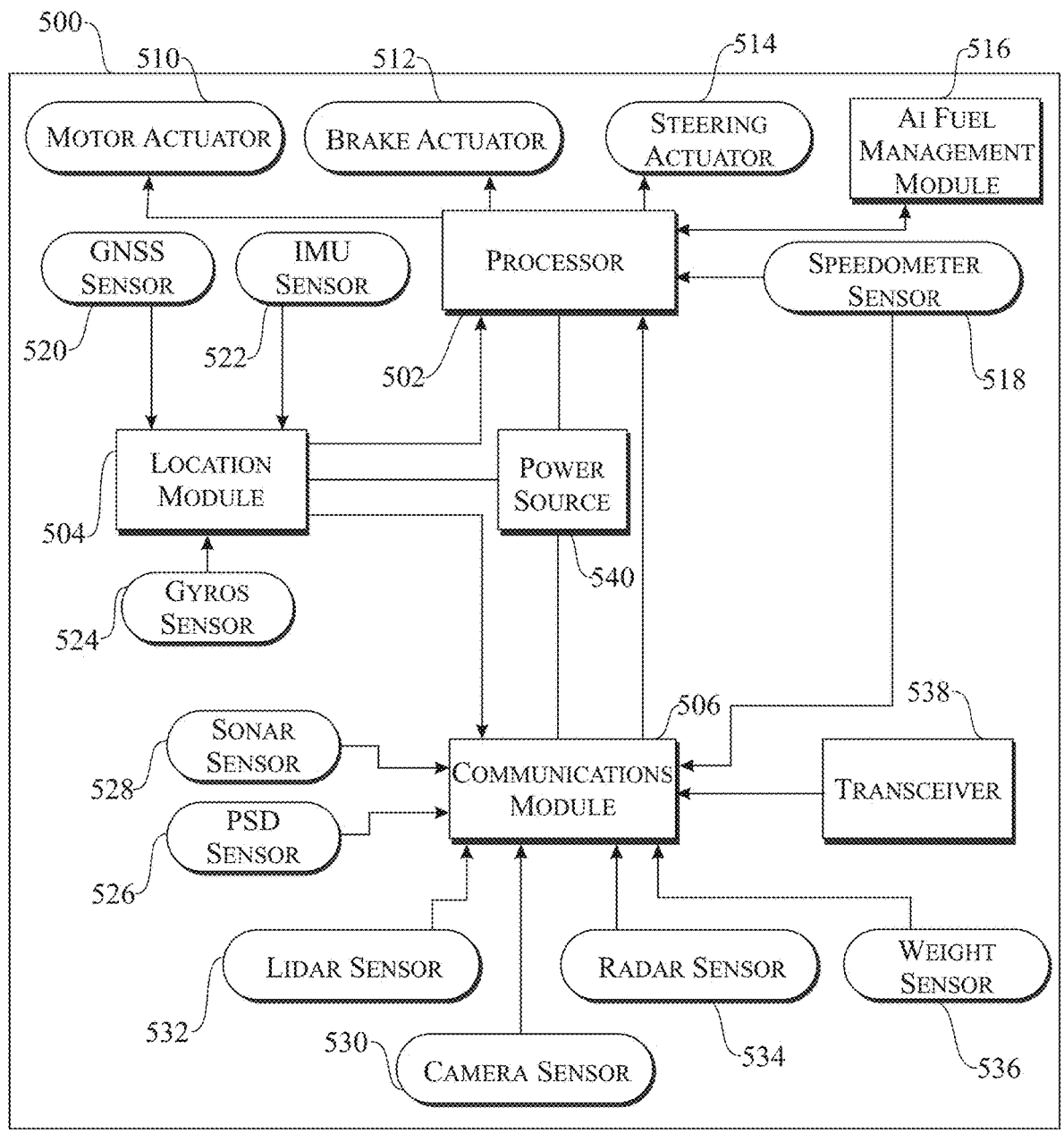
FIG. 5 presents an illustrative schematic for an artificial intelligence fuel management device in accordance with an embodiment.

Turning our attention to FIGS. 3, 4, and 5, FIG. 3 presents an illustrative hybrid-electric vehicle 300 configured with an artificial intelligence fuel management device in accordance with an embodiment. The hybrid-electric vehicle 300 comprises at least artificial intelligence fuel management (AIFM) device 500, fuel tank 302 for storing a liquid fuel (e.g., gasoline), internal combustion engine (ICE) 304 for powering motor 314 and driving mechanical coupling 316 which is mechanically coupled with wheels 320 (e.g., four (4) wheel total), plug 306 for electrically charging the battery and charger 308 and energy storage system 310 (e.g., fuel cells). The energy stored thereby being converted by power electric converter 312 for also powering the electric motor 314 and driving the mechanical coupling 314, as will be well understood. The artificial intelligence fuel management device 500 is communicatively coupled (e.g., a wireless communications link) with located-based service module 318 (e.g., a Global Positioning System (GPS)) that facilitates the identification of and transmission of the hybrid-electric vehicle's 300 present geographical position. The artificial intelligence fuel management device 500 may be installed anywhere in the hybrid-electric vehicle 300. As will be appreciated, the hybrid-electric vehicle 300 may contain a variety of other components, apparatus, devices, etc. that are typically configured therein.

In a further embodiment, FIG. 4 shows an illustrative hydrogen fuel cell electrical vehicle 400 configured with an artificial intelligence fuel management device 500 in accordance with an embodiment. Hydrogen fuel is known to be clean burning fuel (with zero or near zero emissions when consumed or burned by a vehicle having either an ICE or fuel cell for conversion into electrical energy) that is a high pressure, zero-carbon fuel burned with oxygen (provided that it is created in a process that does not involve carbon) and can be used in fuel cells or internal combustion engines. Hydrogen fuel cells produce electricity by combining hydrogen and oxygen atoms. The hydrogen reacts with oxygen across an electrochemical cell similar to that of a battery to produce electricity, water, and small amounts of heat. Illustratively, in accordance with the principles of the disclosed embodiments, such a vehicle may be a fuel cell electric vehicles (FCEVs) that are powered by hydrogen. FCEVs use a propulsion system similar to that of electric vehicles, where energy stored as hydrogen is converted to electricity by the fuel cell. Unlike conventional internal combustion engine vehicles, these vehicles produce no harmful tailpipe emissions (i.e., they only emit water vapor and warm air). For example, FCEVs are fueled with pure hydrogen gas stored in a tank (e.g., fuel tank 402) on the vehicle. Similar to conventional internal combustion engine vehicles, they can fuel in less than four (4) minutes and have a driving range over three hundred (300) miles. One common type of fuel cell for such vehicle applications is a polymer electrolyte membrane (PEM) fuel cell. As shown, the hydrogen fuel cell electrical vehicle 400 comprises at least artificial intelligence fuel management device 500, fuel tank 402 for storing the hydrogen gaseous fuel (or may be configured to hold other types of alternative fuels such as liquid propane, for example), fuel cell 404 for producing the electrical energy. Battery 406 for storing the converted electrical energy and supplying power to various components of the hydrogen fuel cell electrical vehicle 400 and powering electric motor 408 which is mechanically coupled with wheels 412 (e.g., four (4) wheel total). Fuel tank inlet 410 is used for refueling the fuel tank 402 with hydrogen (or any other alternative fuel based on the vehicle's configuration) in accordance the principles of the disclosed embodiments. The artificial intelligence fuel management device 500 is communicatively coupled (e.g., a wireless communications link) with located-based service module 414 (e.g., GPS) that facilitates the identification of and transmission of the hydrogen fuel cell electrical vehicle's 400 present geographical position. The artificial intelligence fuel management device 500 may be installed anywhere in the hydrogen fuel cell electrical vehicle 400. As will be appreciated, the hydrogen fuel cell electrical vehicle 400 (or as similarly configured to utilized other types of alternative fuels such as liquid propane) may contain a variety of other components, apparatus, devices, etc. that are typically configured therein. As noted, the hydrogen fuel cell electrical vehicle 400 is exemplary and any alternative fuel configuration (e.g., liquid propane) may be utilized in accordance with the disclosed embodiments for vehicles comprising internal combustion engines and/or fuel cells.

As shown in both FIG. 3 and FIG. 4, each vehicle type therein comprises at least one artificial intelligence fuel management device installed therein. Turning our attention to FIG. 5, an illustrative schematic for the artificial intelligence fuel management device 500 is shown in accordance with an embodiment. As detailed above, various vehicular operations are constantly monitored in real-time by the artificial intelligence fuel management device 500 for use in optimizing fuel management and providing optimal routing and vehicle fueling options for a trip route in accordance with the disclosed embodiments. Further, in an embodiment, one or more of the vehicles is an autonomous vehicle. Thus, the illustrative configuration of the artificial intelligence fuel management device 500 has a variety of components for use with and for the realization of such fuel management optimization. More particularly, the artificial intelligence fuel management device 500 comprises at least one processor 502 for the execution of the various operations performed thereby. Of course, the principles of the disclosed embodiments herein apply equally to any number of processor and/or microcontrollers so long as the artificial intelligence fuel management device 500 comprises at least one such processor and/or microcontroller. The processor 502, as powered by power source 540, and coupled with AI fuel management module 516 (for enabling the AI algorithms hereunder) may include both general and special purpose microprocessors and may be the sole processor or one of multiple processors of the device. The processor 502 may comprise one or more central processing units (CPUs) and may include, be supplemented by, or incorporated in, one or more application-specific integrated circuits (ASICs) and/or one or more field programmable gate arrays (FPGAs). Further, as will be readily understood, the core elements of any microcontroller are the: (i) processor (CPU) that processes and responds to various instructions that direct the microcontroller's function. This involves performing basic arithmetic, logic, and input/output (I/O) operations. The processor may also perform data transfer operations, which communicate commands to other components in the larger embedded systems. Microcontroller processors can be based on a complex instruction set computing (CISC) or reduced instruction set computing (RISC); (ii) memory used to store the data that the processor receives and uses to respond to instructions for execution thereof. A microcontroller has two main memory types, program memory, which stores long-term information about the instructions that the CPU carries out. Program memory is non-volatile memory, meaning it holds information over time without needing a power source, and data memory, which is required for temporary data storage while the instructions are being executed. Data memory is volatile, meaning the data it holds is temporary and is only maintained if the device is connected to a power source; and (iii) I/O peripherals that are input and output devices which interface for the processor to the external environment. The input ports receive information and send the information to the processor in the form of binary data. The processor receives that data and sends the necessary instructions to output devices that execute tasks external to the microcontroller. A microcontroller's processor will vary by application, and options range from a simple 4-bit, 8-bit or 16-bit processors to more complex 32-bit or 64-bit processors. Microcontrollers can use volatile memory types such as random access memory (RAM) and non-volatile memory types including flash memory, erasable programmable read-only memory (EPROM) and electrically erasable programmable read-only memory (EEPROM). Other supporting elements of a microcontroller include: (i) an analog to digital converter (ADC) which is a circuit that converts analog signals to digital signals and allows the processor at the center of the microcontroller to interface with external analog devices, such as sensors; (ii) a digital to analog converter (DAC) which performs the inverse function of an ADC and allows the processor at the center of the microcontroller to communicate its outgoing signals to external analog components; (iii) at least one system bus that links all components of the microcontroller together; and (iv) at least one serial or parallel port that allows the microcontroller to connect to external components.

The processor 502 may also comprise artificial intelligence capabilities (and/or an artificial intelligence processor) together with the AI fuel management module 516. As will be readily understood, artificial intelligence (AI) refers to the simulation of human intelligence in machines that are programmed to think like humans and mimic their actions. The term may also be applied to any machine that exhibits traits associated with a human mind such as learning and problem-solving. As such, AI is intelligence demonstrated by machines, unlike the natural intelligence displayed by humans and animals, which involves consciousness and emotionality. Artificial intelligence is typically divided into two different categories: weak and strong. Weak artificial intelligence embodies a system designed to carry out one particular job. Strong artificial intelligence systems are systems that carry on the tasks considered to be human-like. These tend to be more complex and complicated systems. They are programmed to handle situations in which they may be required to problem solve without having a person intervene. In AI there is a defined field of study directed to so-called "intelligent agents", that is, any device that perceives its environment and takes actions that maximize its chance of successfully achieving its goals. Colloquially, the term "artificial intelligence" is often used to describe machines that mimic "cognitive" functions that humans associate with the human mind, such as "learning" and "problem solving. The ideal characteristic of artificial intelligence is its ability to rationalize and take actions that have the best chance of achieving a specific goal. A subset of artificial intelligence is machine learning, which refers to the concept that computer programs can automatically learn from and adapt to new data without being assisted by humans. Deep learning techniques enable this automatic learning through the absorption of huge amounts of unstructured data such as text, images, or video. In accordance with the principles of the disclosed embodiments, any AI algorithm that is strong in variable analysis, optimization and predication may be employed including, but not limited to, Linear Regression, Logistic Regression, Linear Discriminant Analysis, Classification and Regression Trees, Naive Bayes, K-Nearest Neighbors (KNN), Learning Vector Quantization (LVQ), Support Vector Machines (SVM), and Random Forest, to name just a few.

As shown in FIG. 5, the artificial intelligence fuel management device 500 further comprises a transceiver 538, and a plurality of sensors and actuators. For example, communicatively coupled with the processor 502 are a camera sensor 530, a LIDAR sensor 532, a radar sensor 534, a weight sensor 536, a sonar sensor 528, a PSD (Position Sensing Diode) sensor 526, and a speedometer sensor 518. Such sensors being coupled with communication module 506 that is further coupled the processor 502 and location module 504. Similarly, communicatively coupled with the processor 502, by and through the location module 504, are gyros sensor 524 (e.g., a gyroscope), GNSS (Global Navigation Satellite System) sensor 520, IMU (Inertial Measurement Unit) sensor 522. Further, the processor 502 has communicatively coupled therewith the speedometer sensor 518, a motor actuator 510, a brake actuator 512, and a steering actuator 514.

Figure 7:
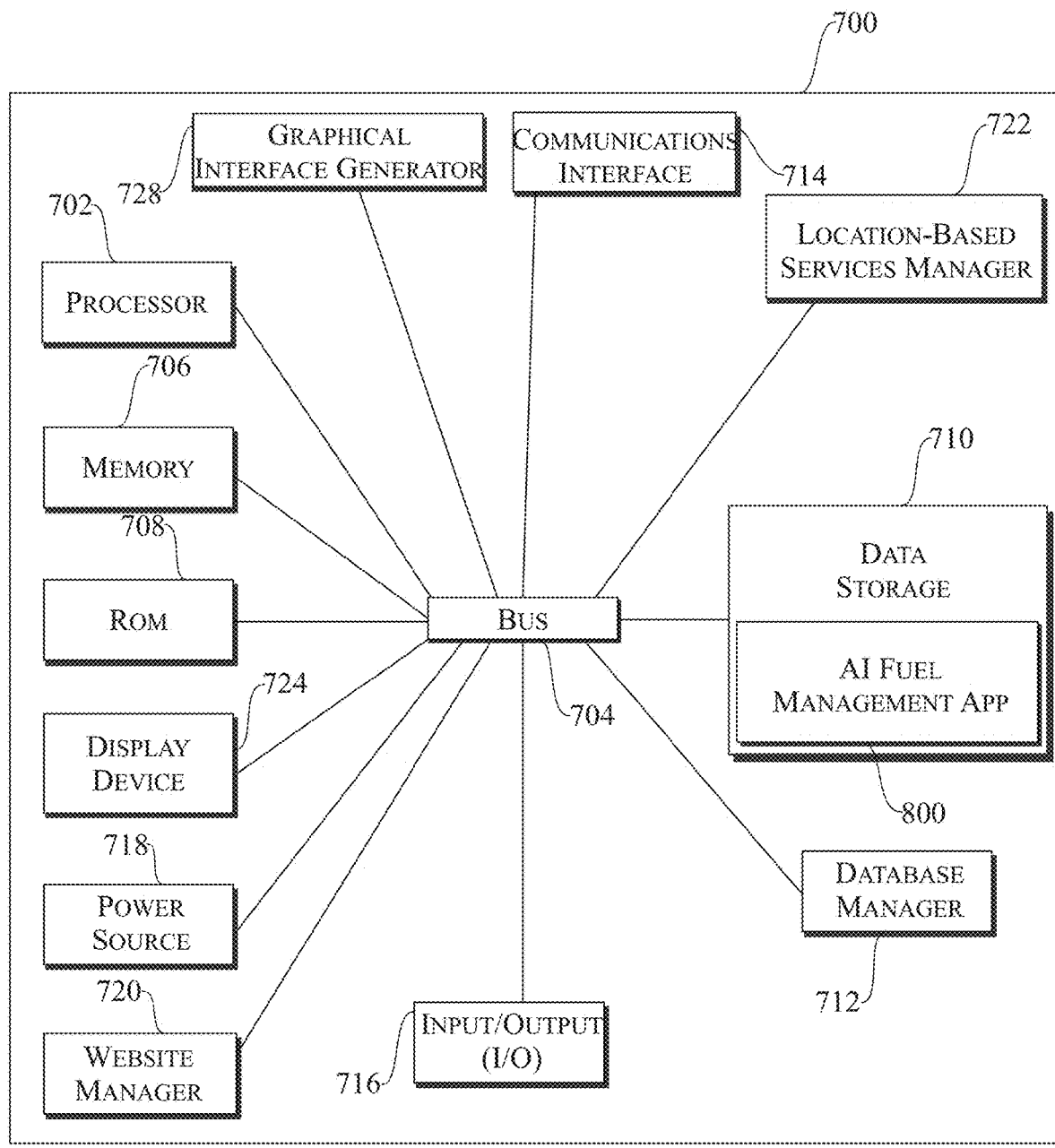
FIG. 7 presents an illustrative artificial intelligence fuel management system in accordance with an embodiment.

Turning our attention to FIGS. 6 and 7, FIG. 6 presents a high-level block diagram of a cloud network services architecture 600 for facilitating optimizing fuel management for a vehicle(s) and providing optimal routing and vehicle fueling options for a trip route in accordance with an embodiment, and FIG. 7 presents an illustrative artificial intelligence fuel management system 700 in accordance with an embodiment. As noted previously, the artificial intelligence fuel management device 500 configured with any particular one vehicle may be in communication with the artificial intelligence fuel management system 700 for optimizing fuel management for such vehicle and providing optimal routing and vehicle fueling options for a trip route thereof, as detailed herein above. As shown for instance in FIG. 6, the cloud network services architecture 600 includes a cloud 602 comprising at least server(s) 604, access point(s) 606 and database(s) 608. Illustratively, the cloud 602 facilitates the delivery of optimizing fuel management for a vehicle(s) (e.g., vehicle 612, vehicle 614, vehicle 616, vehicle 618, and vehicle 620; each which comprising and configure with the respective artificial intelligence fuel management device 500) and providing optimal routing and vehicle fueling options for a trip route using artificial intelligence fuel management system 700. In an embodiment, such services, offered by and through the cloud network services architecture 600, the artificial intelligence fuel management device 500, and/or artificial intelligence fuel management system 700 may be facilitated by the execution of an artificial intelligence fuel management app 800 (see, FIG. 8), further detailed herein below.

As noted above, the cloud 602 comprises at least server(s) 604, the access point(s) 1606 and the database(s) 608. Cloud, cloud service, cloud server and cloud database are broad terms and are to be given their ordinary and customary meaning to one of ordinary skill in the art and includes, without limitation, any database, data repository or storage media which store content typically associated with and managed by users, location-based services platforms 626 and third-party content platforms 628, to name just a few, for the optimizing fuel management for a vehicle(s) and providing optimal routing and vehicle fueling options (using one or more fueling stations 624) for a trip route in accordance the services detailed herein. A cloud service may include one or more cloud servers and cloud databases that provides for the remote storage of content as hosted by a third-party service provider or operator. A cloud server may include an HTTP/HTTPS server sending and receiving messages to provide web-browsing interfaces to client web browsers as well as web services to send data to integrate with other interfaces (e.g., as executed on any user device). The cloud server may be implemented in one or more servers and may send and receive content in a various forms and formats, user supplied and/or created information/content and profile/configuration data that may be transferred from or stored in a cloud database (e.g., the databases 608). A cloud database may include one or more physical servers, databases or storage devices as dictated by the cloud service's storage requirements. The cloud database may further include one or more well-known databases (e.g., an SQL database) or a fixed content storage system to store content, user profile information, configuration information, administration information and any other information necessary to execute the cloud service. In various embodiments, one or more networks supplying computing infrastructure on behalf of one or more users may be referred to as a cloud, and resources may include, without limitation, data center resources, applications (e.g., software-as-a-service or platform-as-a-service) and management tools.

Turning our attention to FIG. 7, an illustrative configuration for the artificial intelligence fuel management system 700 is shown for deployment in the cloud network services architecture 600 in accordance with an embodiment. As shown, the artificial intelligence fuel management system 700 comprises processor 702 for executing program code (e.g., artificial intelligence fuel management app 800 including the execution of one or more AI algorithms as enabled by AI algorithm module 828) and communications interface 714 for managing communications to and from the artificial intelligence fuel management system 700, memory 706 and/or read-only memory (ROM) 708 for storing program code and data, and power source 718 for powering the artificial intelligence fuel management system 700. The processor 702 may include both general and special purpose microprocessors and may be the sole processor or one of multiple processors of the device. Further, the processor 702 may comprise one or more central processing units (CPUs) and may include, be supplemented by, or incorporated in, one or more application-specific integrated circuits (ASICs), one or more AI processors, and/or one or more field programmable gate arrays (FPGAs). The memory 706 is coupled to the bus 704 for storing computer-readable instructions to be executed by the processor 702 (e.g., execution of the artificial intelligence fuel management app 800). The memory 706 may also be utilized for storing temporary variables or other intermediate information during the execution of the instructions by the processor 702. Further, data storage device 710, such as a magnetic, optical, or solid-state device may be coupled to the bus 704 for storing information and instructions for the processor 702 including, but not limited to, the artificial intelligence fuel management app 800. Data storage device 710 and the memory 706 may each comprise a non-transitory computer readable storage medium and may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices. Database manager 712 is used to manage the delivery and storage of content, data, and other information in artificial intelligence fuel management system database(s) 622, database(s) 608 and across third-party content platforms 628, for example. The database(s) 622 may store and provide information including, but not limited to, user IDs 630, user profiles 632, vehicle information 634, fueling station information 636, route information 638, and mobile payment information 640.

Website manager 720 is used to deliver and manage content, data, and other information across one or more websites that may be utilized to access and use the artificial intelligence fuel management system 700, for example. Further, the operations provided by and through the artificial intelligence fuel management app 800 may be offered through a web-based application. As will be discussed in greater detail herein below, the artificial intelligence fuel management app 800, as stored in data storage 710, when executed by the processor 702 will facilitate the delivery of the vehicular fuel management and trip optimization services hereunder. Graphical user interface generator 728 facilitates the rendering and display of information, for example, on display device 724. Location-based services manager 722 facilitates the delivery of location-based services (e.g., GPS tracking) as employed hereunder. For example, in identifying the present geographical location of any particular vehicle.

In an embodiment, the vehicular fuel management and trip optimization services provided through the execution of the artificial intelligence fuel management app 800 may also include a web-based delivery platform and/or accessing and interfacing any number of web using the website manager 720 for procuring information and data that can be used in the artificial intelligence fuel management system 700. The term "website" in the context herein is used in a conventional and broadest sense and is located on at least one server containing web pages stored thereon and is operational in a 24-hour/7-day typical fashion. Further, as shown in the cloud network services architecture 600, the plurality of vehicles (i.e., the vehicles 612-620) may alternatively utilize well-known Internet 644 for access to artificial intelligence fuel management system 700 by and through a web browser executing thereon or interfaced therewith.

The communications interface 714 is used to facilitate communications across the communications links 642 (see, FIG. 6) within the cloud network services architecture 600. This may take the form, for example, of a wide area network connection that communicatively couples the artificial intelligence fuel management system 700 with the access points 606 (see, FIG. 6) which may be a cellular communications service. Similarly, communications managed by the communications interface 714 may take the form, for example, of a local Wi-Fi network interface or Ethernet interface the communicatively couples the artificial intelligence fuel management system 700 with, for example, the Internet 644, and ultimately the plurality of vehicles (i.e., the vehicles 612-620). In the instant embodiment, the artificial intelligence fuel management app 800 and/or the communications interface 714 may include a communications stack for facilitating communications over the respective communications links 642. Electronic communications by and through artificial intelligence fuel management system 700 between the various systems, networks, devices, users, entities, and/or individuals are facilitated by the communications links 642 in accordance with any number of well-known communications protocols and methods (e.g., wireless communications). The artificial intelligence fuel management system 700 may also include one or more input/output devices 716 that enable user interaction therewith (e.g., camera, display, keyboard, mouse, speakers, microphone, buttons, etc.). The input/output devices 716 may include peripherals, such as a camera, printer, scanner, touchscreen display, etc. For example, the input/output devices 716 may include a display device such as a cathode ray tube (CRT), plasma monitor, liquid crystal display (LCD) monitor or organic light-emitting diode (OLED) monitor for displaying information to the user, a keyboard, and a pointing device such as a mouse or a trackball by which the user can provide input to the system, for example.

Turning our attention to FIG. 8, an illustrative architecture for the operation of the artificial intelligence fuel management app 800 is presented in accordance with an embodiment. As will be appreciated, the architecture may be used, illustratively, in conjunction with the cloud network services architecture 600, the artificial intelligence fuel management system 700, and/or any other user device for launching and executing the artificial intelligence fuel management app 800 and its associated operations (e.g., as detailed herein above). As will be appreciated, a "user device" in the context herein may comprise a wide variety of devices such as any type of hardware device, mobile devices, smartphones, laptop computers, desktop computers, kiosks, tablets, and wearable device, to name just a few, that execute applications (e.g., a mobile application) in accordance with the principles of the disclosed embodiments herein. As shown, the architecture for the operations of the artificial intelligence fuel management app 800 provides several interfaces and engines used to perform a variety of functions such as the collection, aggregation, manipulation, processing, analyzing, verification, authentication, and display of applicable real-time information and data that are useful to realize the delivery of the vehicular fuel management and trip route optimization of the disclosed embodiments. More particularly, data display interface module 818 and communications module 812 are used to facilitate the input/output and display of electronic data and other information to, illustratively, the users operating a vehicle (e.g., the vehicle 614) and/or employing a user device for executing the artificial intelligence fuel management app 800. The data collection module 806 facilitates, for example, personal/user profile information, and other information from the users the artificial intelligence fuel management device 500 and/or the artificial intelligence fuel management system 700, for example. The location-based services and geofencing module 820 provides for the delivery of location-based services in order for the present geographical location of the vehicle(s) hereunder to be identified and displayed (e.g., GPS locations). The communications module 812 will facilitate communications by and through the artificial intelligence fuel management system 700, for example.

Execution engine 802 may be employed to deliver the vehicular fuel management and trip route optimization operations through the execution of the artificial intelligence fuel management app 800 (including the execution of one or more AI algorithms as enabled by AI algorithm module 828). In such delivery, the execution engine 802 will operate and execute, as further detailed herein below, with at least the following program modules: graphical user interface module 804, data collection module 806, vehicle administration and management module 808, routing module 810, communications module 812, artificial intelligence fuel management operations module 814, fueling station administration and management module 816, data display interface module 818, location-based services module 820, mobile payment administration and management module 822, route weather administration and management module 824, traffic/road conditions administration and management module 826, and AI algorithm module 828. For example, the fueling station administration and management module 816 assists with making reservations for vehicle refueling at fueling stations (e.g., the fueling stations 624) that are known to be available, and mobile payment administration and management module 822 facilitates electronic payments at one or more fueling stations when the artificial intelligence fuel management device 500 and/or the artificial intelligence fuel management system 700 have indicated refueling is necessary for a particular vehicle. The operations executed by the foregoing modules are as discussed herein. Traffic/road conditions administration and management module 826 facilitates the monitoring and delivery of real-time traffic and/or road conditions along a particular trip route for optimizing the operations executed (e.g., the monitoring of the real-time trip parameters during the completion of a particular trip route) and for communication of the same to the driver. AI algorithm module 828 enables the execution of one or more AI algorithms for performing the real-time monitoring and execution of the various operations for the refueling determination to be made, as detailed herein above, in accordance with the applicable present position fuel management condition, single destination route fuel management condition, multi-destination route fuel management condition, and/or top-off fuel management condition and if refueling is necessary the most proximate of the fueling stations will be identified. Thus, as each trip route is completed the AI algorithm module 828 is able to use such information for updating the prediction of future trip routes thereby improving the overall trip route and refueling optimization results. As detailed herein, while FIG. 8 describes an embodiment of the artificial intelligence fuel management app 800 for execution, illustratively, on the artificial intelligence fuel management device 500 and/or the artificial intelligence fuel management system 700 it will also be understood that other user devices or hardware devices may be used to execute and operate the artificial intelligence fuel management app 800 in any real-time setting including but not limited to the cloud network services architecture 600.

Those skilled in the art will appreciate that the present disclosure contemplates the use of systems configurations and/or computer instructions that may perform any or all of the operations involved in optimizing fuel management and vehicle service times for a variety of vehicle types through determining the remaining trip range for a vehicle and providing optimal routing and vehicle fueling options for a trip route in accordance with principles of the disclosed embodiments. The disclosure of computer instructions that include, for example, the artificial intelligence fuel management app 800 and the artificial intelligence fuel management system 700 instructions is not meant to be limiting in any way. Those skilled in the art will readily appreciate that stored computer instructions and/or systems configurations may be configured in any way while still accomplishing the various goals, features, and advantages according to the present disclosure. The terms "program," "application," "software application," and the like as used herein, are defined as a sequence of instructions designed for execution on a computer system. A "program," "computer program," "application," or "software application" may include a subroutine, a function, a procedure, an object method, an object implementation, an executable application, an applet, a servlet, a source code, an object code, a shared library/dynamic load library, and/or other sequence of instructions designed for execution on a computer system. The disclosed embodiments and their principles may be described in the general context of computer code or machine-useable instructions, including computer-executable instructions such as program modules, being executed by a computer, processor or other machine, such as a smartphone or other handheld device. Generally, program modules including routines, programs, objects, components, data structures, etc., refer to code that perform particular tasks or implement particular abstract data types. The embodiments may be practiced in a variety of system configurations, including, but not limited to, mobile devices, consumer electronics, general-purpose computers, and specialty computing devices. Further, the embodiments may also be practiced in distributed computing environments where tasks are performed by remote-processing devices that are linked through a communications network. Accordingly, applications herein may be written using any number of programming languages and/or executed on compatible platforms including, but not limited to, JavaScript, PHP (PHP: Hypertext Preprocessor), WordPress, Drupal, Laravel, React.js, Angular.js, and Vue.js. Computer readable program instructions for carrying out operations of the disclosed embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on one or more standalone computers, partly on one or more standalone computers, as a stand-alone software package, partly on one or more standalone computers and partly on one or more remote computers, partly on one or more standalone computers and partly on one or more distributed computing environments (such as a cloud environment), partly on one or more remote computers and partly on one or more distributed computing environments, entirely on one or more remote computers or servers, or entirely on one or more distributed computing environments. Standalone computers, remote computers, and distributed computing environments may be connected to each other through any type of network or combination of networks, including local area networks (LANs), wide area networks (WANs), through the Internet (e.g., using an Internet Service Provider), or the connection may be made to external computers.

Figure 9:
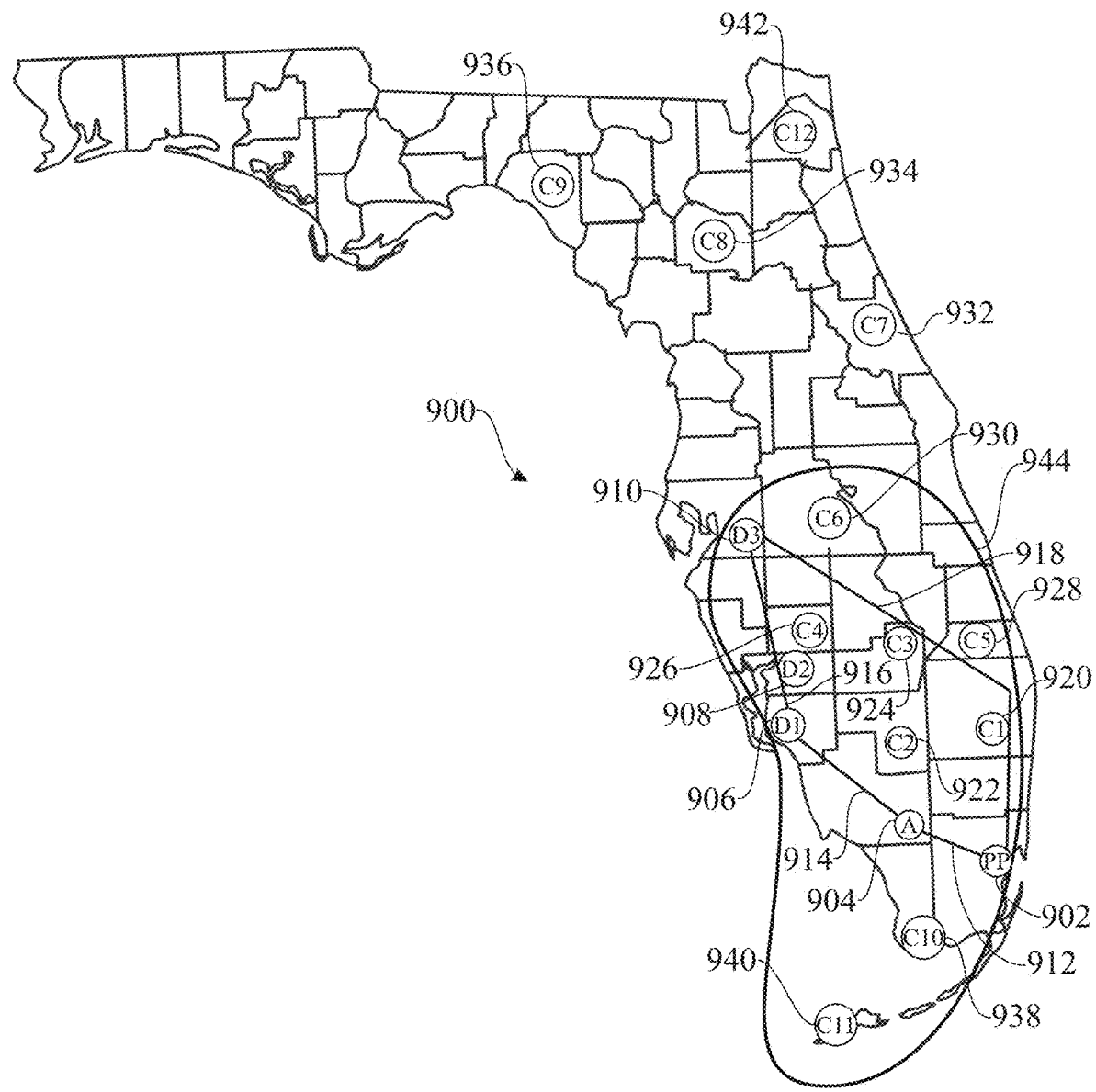
FIG. 9 presents an illustrative user device interface for optimizing fuel management for a vehicle(s) and providing optimal routing and vehicle fueling options for a trip route in accordance with an embodiment.

Turning our attention to FIG. 9, an illustrative user device interface 900 is shown for optimizing fuel management for a vehicle(s) and providing optimal routing and vehicle fueling options for a trip route 944 in accordance with an embodiment. More particularly, the trip route 944 comprises, illustratively, a route(s) starting at present position 902 (i.e., a present geographical position of a vehicle) and having a pick-up location 904 (with a trip route segment 912) and comprises individual trip segments (e.g., trip route segment 912, trip route segment 914, trip route segment 916 and trip route segment 918). The illustrative trip route 944 may be either a single destination route or a multi-destination route between any of the plurality of destination shown (i.e., destination D1 906, destination D2 908, and destination D3, 910). As detailed herein above, a determination is made, by the artificial intelligence fuel management device associated with the vehicle undertaking the trip route 944, if the trip route 944 is either the single destination route (e.g., between pick-up location 904 and destination D1 906 (the final destination) along a trip route comprising the trip route segment 912 and trip route segment 914) or the multi-destination route (e.g., between pick-up location 904, destination D1 906, destination D2 and destination D3 (the final destination) along trip route segment 912, trip route segment 914 and trip route segment 916). A refueling determination will be made, as detailed herein above, in accordance with the applicable present position fuel management condition, single destination route fuel management condition, multi-destination route fuel management condition, and/or top-off fuel management condition and if refueling is necessary the most proximate of the refueling stations will be identified (i.e., refueling station C1 920, refueling station C2 922, refueling station C3 924, refueling station C4 926, refueling station C5 928, refueling station C6 930, refueling station C7 932, refueling station C8 934, refueling station C9 936, refueling station C10 938, refueling station C11 940, and refueling station C12 942) for routing the vehicle thereto.

As noted above, in some embodiments the method(s) described above may be executed or carried out by a computing system including a non-transitory computer-readable storage medium, also described herein as a storage machine, that holds machine-readable instructions executable by a logic machine (i.e., a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Thus, the steps of the disclosed method(s) and the associated discussion herein above can be defined by the computer program instructions stored in a memory and/or data storage device and controlled by a processor executing the computer program instructions. Accordingly, by executing the computer program instructions, the processor executes an algorithm defined by the disclosed method. For example, the computer program instructions can be implemented as computer executable code programmed by one skilled in the art to perform the illustrative operations defined by the disclosed methods. Further, it will be appreciated that any flowcharts, flow diagrams, state transition diagrams, pseudo code, program code and the like represent various processes which may be substantially represented in computer readable medium and so executed by a computer, machine, or processor, whether or not such computer, machine or processor is explicitly shown. One skilled in the art will recognize that an implementation of an actual computer or computer system may have other structures and may contain other components as well, and that a high-level representation of some of the components of such a computer is for illustrative purposes.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A method comprising:
   initializing, by an artificial intelligence fuel management device associated with a particular one vehicle of a plurality of vehicles, a vehicle state and confirming a vehicle weight for the particular one vehicle, wherein each vehicle of the plurality of vehicles is fueled by at least one of a liquid fuel and an alternative fuel, and wherein the liquid fuel is either gasoline or diesel, and the alternative fuel is either electricity, bio-fuel, bio-alcohol, synthetic and paraffinic, steam, heat, vegetable and waste-derived oils, compressed air, liquid nitrogen, liquid petroleum gas, propane, hydrogen, ethanol, methanol, butanol, or natural gas;
   determining, by the artificial intelligence fuel management device associated with the particular one vehicle of the plurality of vehicles, a present geographical position of the particular one vehicle;
   receiving, by the artificial intelligence fuel management device associated with the particular one vehicle of the plurality of vehicles, a present position fuel management condition associated with the particular one vehicle, wherein the present position fuel management condition is defined as a function of at least the particular one vehicle's available range and vehicle endurance;
   applying, by the artificial intelligence fuel management device associated with the particular one vehicle of the plurality of vehicles, the present position fuel management condition received for determining whether a refueling of the particular one vehicle is currently needed, and if the present position fuel management condition applied is indicative that the refueling is necessary then redirecting the particular one vehicle from the present geographical position determined to a particular one refueling station of a plurality of refueling stations that is most proximate to the particular one vehicle for the refueling thereof;
   receiving, by the artificial intelligence fuel management device associated with the particular one vehicle of the plurality of vehicles, a trip route to be undertaken by the particular one vehicle, the trip route received comprising one of a single destination route and a multi-destination route, wherein the single destination route comprises at least a pick-up location and a final destination location, and the multi-destination route comprises at least the pick-up location, the final destination location and at least one other destination location between the pick-up location and the final destination;
   determining, by the artificial intelligence fuel management device associated with the particular one vehicle of the plurality of vehicles, if the trip route received is either the single destination route or the multi-destination route, and
   in the event of the single destination route determination:
      applying, by the artificial intelligence fuel management device associated with the particular one vehicle of the plurality of vehicles, a single destination route fuel management condition for determining whether the refueling of the particular one vehicle is currently needed before embarking on the trip route received, and if the single destination route fuel management condition applied is indicative that the refueling is necessary then redirecting, prior to initiating the trip route to the pick-up location, the particular one vehicle from the present geographical position determined to the particular one refueling station of the plurality of refueling stations that is most proximate to the particular one vehicle for the refueling, otherwise if the single destination route fuel management condition applied is indicative that the refueling is not necessary then completing the trip route received by the particular one vehicle and monitoring a plurality of real-time vehicle parameters during the completion thereof,
   in the event of the multi-destination route determination:
      applying, by the artificial intelligence fuel management device associated with the particular one vehicle of the plurality of vehicles, a multi-destination route fuel management condition for determining whether the refueling of the particular one vehicle is currently needed before embarking on the trip route, and if the multi-destination route fuel management condition applied is indicative that the refueling is necessary then redirecting, prior to initiating trip route to the pick-up location, the particular one vehicle from the present geographical position determined to the particular one refueling station of the plurality of refueling stations that is most proximate to the particular one vehicle for the refueling, otherwise if the multi-destination route fuel management condition applied is indicative that the refueling is not necessary then completing the trip route received by the particular one vehicle and monitoring the plurality of real-time vehicle parameters during the completion thereof, and determining, by the artificial intelligence fuel management device associated with the particular one vehicle of the plurality of vehicles, whether the particular one vehicle is currently in use on any trip route and if not currently in use and at an idling location, then applying a top-off fuel management condition for determining whether a top-off refueling of the particular one vehicle is currently needed to bring a current fuel level of the particular one vehicle equal to a maximum fuel tank capacity level of a fuel tank of the particular one vehicle, and if the top-off fuel management condition applied is indicative that the refueling is necessary then redirecting the particular one vehicle from the idling location to the particular one refueling station of the plurality of refueling stations that is most proximate to the particular one vehicle for the refueling, otherwise if the top-off fuel management condition applied is indicative that the refueling is not necessary then remaining at the idling location and monitoring the plurality of real-time vehicle parameters.

2. The method of claim 1, wherein the particular one vehicle is a hybrid-electric vehicle.

3. The method of claim 1, wherein the plurality of real-time vehicle parameters monitored is performed at a minimum interval of one (1) minute during the particular one vehicle's operation.

4. The method of claim 1, wherein each vehicle of the plurality of vehicles is an autonomous vehicle.

5. The method of claim 1, wherein the method further comprises:
determining, by the artificial intelligence fuel management device associated with the particular one vehicle of the plurality of vehicles, the particular one refueling station of the plurality of refueling stations that is most proximate to the particular one vehicle for the refueling thereof.

6. The method of claim 1, wherein the particular one refueling station of the plurality of the plurality of refueling stations is an automated fueling station.

7. The method of claim 6, wherein the automated fueling station is configured for robotic fueling of the particular one vehicle.

8. The method of claim 7, wherein the method further comprises:
transmitting, by the artificial intelligence fuel management device associated with the particular one vehicle of the plurality of vehicles, a refueling appointment request to the automated fueling station and an estimated time of arrival to the automated fueling station by the particular one vehicle;
remitting upon completion of the refueling of the particular one vehicle, by the artificial intelligence fuel management device associated with the particular one vehicle of the plurality of vehicles, a payment for the refueling thereof; and
receiving, by the artificial intelligence fuel management device associated with the particular one vehicle of the plurality of vehicles, a notification that the particular one vehicle may safely exit the automated fueling station.

9. The method of claim 1, wherein the plurality of real-time vehicle parameters monitored comprise at least a vehicle endurance, a vehicle trip range, a vehicle engine operational current state, and total operational power requirements.

10. The method claim 9, wherein the method further comprises:
transmitting, by the artificial intelligence fuel management device associated with the particular one vehicle of the plurality of vehicles, the plurality of real-time vehicle parameters monitored to an artificial intelligence fuel management system that is providing fuel management to the plurality of vehicles.

11. The method of claim 10, wherein the method further comprises:
receiving, from the artificial intelligence fuel management system, by the artificial intelligence fuel management device associated with the particular one vehicle of the plurality of vehicles real-time trip information comprising at least current traffic conditions and current weather conditions along the trip route received.

12. The method of claim 1, wherein the present position fuel management condition applied is given by:
if
(i) available vehicle range at a current fuel level for the particular one vehicle and the vehicle weight confirmed therefore is equal to or less than ($<=$) thirty percent (30%) of a full fuel level range for the particular one vehicle; and
(ii) available vehicle endurance at the current fuel level for the particular one vehicle and the vehicle weight confirmed therefore is equal to or less than ($<=$) two (2) hours of vehicle endurance, wherein the vehicle endurance is measured as a function of fuel needed to power the particular one vehicle's heating system, air conditioning system and total operational power requirements of the particular one vehicle;
then the refueling is necessary.

13. The method of claim 1, wherein the single destination route fuel management condition is given by:
if (an available vehicle range and endurance at a current fuel level of the particular one vehicle and the vehicle weight confirmed therefore)–(a necessary vehicle range and vehicle endurance to complete, at the vehicle weight confirmed therefore, the single destination route) is:
(i) less than or equal to ($<=$) thirty (30%) of a full fuel level range for the particular one vehicle at the vehicle weight confirmed therefore; or
(ii) less than or equal to ($<=$) two (2) hours of vehicle endurance, wherein the vehicle endurance is measured as a function of fuel needed to power the particular one vehicle's heating system, air conditioning system and total operational power requirements of the particular one vehicle;
then the refueling is necessary.

14. The method of claim 1, wherein the multi-destination route fuel management condition applied is given by:
if (an available vehicle range and endurance at a current fuel level of the particular one vehicle and the vehicle weight confirmed therefore)–(necessary vehicle range and vehicle endurance to complete, at the vehicle weight confirmed therefore, the multi-destination route) is:
(i) less than or equal to ($<=$) twenty-five (25%) of a full fuel level vehicle range for the particular one vehicle at the vehicle weight confirmed therefore; or
(ii) less than or equal to ($<=$) two (2) hours of vehicle endurance, wherein the vehicle endurance is measured as a function of fuel needed to power the particular one vehicle's heating system, air conditioning system and total operational power requirements of the particular one vehicle;
then the refueling is necessary.

15. The method of claim 1, wherein the top-off fuel management condition applied is defined by:
if
(i) an available vehicle range at a current fuel level for the particular one vehicle and the vehicle weight confirmed therefore is less than or equal to (<=) seventy percent (70%) of a full fuel level vehicle range for the particular one vehicle at the vehicle weight confirmed therefore; and
(ii) the present geographical position of the particular one vehicle is less than or equal to (<=) five hundred (500) meters from the particular one refueling station of the plurality of refueling stations that is most proximate to the particular one vehicle;
then the refueling is necessary.

16. A method comprising:
initializing, by an artificial intelligence fuel management device associated with a particular one vehicle of a plurality of vehicles, a vehicle state and confirming a vehicle weight for the particular one vehicle, wherein each vehicle of the plurality of vehicles is fueled by at least one of a liquid fuel and an alternative fuel, and wherein the liquid fuel is either gasoline or diesel, and the alternative fuel is either electricity, bio-fuel, bio-alcohol, synthetic and paraffinic, steam, heat, vegetable and waste-derived oils, compressed air, liquid nitrogen, liquid petroleum gas, propane, hydrogen, ethanol, methanol, butanol, or natural gas, and wherein the particular one vehicle is either a hybrid-electric vehicle or an autonomous vehicle;
determining, by the artificial intelligence fuel management device associated with the particular one vehicle of the plurality of vehicles, a present geographical position of the particular one vehicle;
receiving, by the artificial intelligence fuel management device associated with the particular one vehicle of the plurality of vehicles, a present position fuel management condition associated with the particular one vehicle, wherein the present position fuel management condition is defined as a function of at least the particular one vehicle's available range and vehicle endurance;
applying, by the artificial intelligence fuel management device associated with the particular one vehicle of the plurality of vehicles, the present position fuel management condition received for determining whether a refueling of the particular one vehicle is currently needed, and if the present position fuel management condition applied is indicative that the refueling is necessary then redirecting the particular one vehicle from the present geographical position determined to a particular one refueling station of a plurality of refueling stations that is most proximate to the particular one vehicle for the refueling thereof;
receiving, by the artificial intelligence fuel management device associated with the particular one vehicle of the plurality of vehicles, a trip route to be undertaken by the particular one vehicle, the trip route received comprising one of a single destination route and a multi-destination route, wherein the single destination route comprises at least a pick-up location and a final destination location, and the multi-destination route comprises at least the pick-up location, the final destination location and at least one other destination location between the pick-up location and the final destination;
determining, by the artificial intelligence fuel management device associated with the particular one vehicle of the plurality of vehicles, if the trip route received is either the single destination route or the multi-destination route, and
in the event of the single destination route determination:
applying, by the artificial intelligence fuel management device associated with the particular one vehicle of the plurality of vehicles, a single destination route fuel management condition for determining whether the refueling of the particular one vehicle is currently needed before embarking on the trip route received, and if the single destination route fuel management condition applied is indicative that the refueling is necessary then redirecting, prior to initiating the trip route to the pick-up location, the particular one vehicle from the present geographical position determined to the particular one refueling station of the plurality of refueling stations that is most proximate to the particular one vehicle for the refueling, otherwise if the single destination route fuel management condition applied is indicative that the refueling is not necessary then completing the trip route received by the particular one vehicle and monitoring a plurality of real-time vehicle parameters during the completion thereof, and wherein the plurality of real-time vehicle parameters monitored comprise at least a vehicle endurance, a vehicle trip range, a vehicle engine operational current state, and total operational power requirements;
in the event of the multi-destination route determination:
applying, by the artificial intelligence fuel management device associated with the particular one vehicle of the plurality of vehicles, a multi-destination route fuel management condition for determining whether the refueling of the particular one vehicle is currently needed before embarking on the trip route, and if the multi-destination route fuel management condition applied is indicative that the refueling is necessary then redirecting, prior to initiating trip route to the pick-up location, the particular one vehicle from the present geographical position determined to the particular one refueling station of the plurality of refueling stations that is most proximate to the particular one vehicle for the refueling, otherwise if the multi-destination route fuel management condition applied is indicative that the refueling is not necessary then completing the trip route received by the particular one vehicle and monitoring the plurality of real-time vehicle parameters during the completion thereof; and
determining, by the artificial intelligence fuel management device associated with the particular one vehicle of the plurality of vehicles, whether the particular one vehicle is currently in use on any trip route and if not currently in use and at an idling location, then applying a top-off fuel management condition for determining whether a top-off refueling of the particular one vehicle is currently needed to bring a current fuel level of the particular one vehicle equal to a maximum fuel tank capacity level of a fuel tank of the particular one vehicle, and if the top-off fuel management condition applied is indicative that the refueling is necessary then redirecting the particular one vehicle from the idling location to the particular one refueling station of the plurality of refueling stations that is most proximate to the particular one vehicle for the refueling, otherwise if the top-off fuel management condition applied is indicative that the refueling is not necessary then remaining at the idling location and monitoring the plurality of real-time vehicle parameters.

17. The method of claim 16, wherein:
determining, by the artificial intelligence fuel management device associated with the particular one vehicle of the plurality of vehicles, the particular one refueling station of the plurality of refueling stations that is most proximate to the particular one vehicle for the refueling thereof.

18. The method of claim 16, wherein the present position fuel management condition applied is given by:
if
(i) available vehicle range at a current fuel level for the particular one vehicle and the vehicle weight confirmed therefore is equal to or less than (<=) thirty percent (30%) of a full fuel level range for the particular one vehicle; and
(ii) available vehicle endurance at the current fuel level for the particular one vehicle and the vehicle weight confirmed therefore is equal to or less than (<=) two (2) hours of vehicle endurance, wherein the vehicle endurance is measured as a function of fuel needed to power the particular one vehicle's heating system, air conditioning system and total operational power requirements of the particular one vehicle;
then the refueling is necessary.

19. The method of claim 16, wherein the single destination route fuel management condition is given by:
if (an available vehicle range and endurance at a current fuel level of the particular one vehicle and the vehicle weight confirmed therefore)–(a necessary vehicle range and vehicle endurance to complete, at the vehicle weight confirmed therefore, the single destination route) is:
(i) less than or equal to (<=) thirty (30%) of a full fuel level range for the particular one vehicle at the vehicle weight confirmed therefore; or
(ii) less than or equal to (<=) two (2) hours of vehicle endurance, wherein the vehicle endurance is measured as a function of fuel needed to power the particular one vehicle's heating system, air conditioning system and total operational power requirements of the particular one vehicle;
then the refueling is necessary.

20. A method comprising:
initializing, by an artificial intelligence fuel management device associated with a particular one vehicle of a plurality of vehicles, a vehicle state and confirming a vehicle weight for the particular one vehicle, wherein each vehicle of the plurality of vehicles is fueled by at least one of a liquid fuel and an alternative fuel, and wherein the liquid fuel is either gasoline or diesel, and the alternative fuel is either electricity, bio-fuel, bio-alcohol, synthetic and paraffinic, steam, heat, vegetable and waste-derived oils, compressed air, liquid nitrogen, liquid petroleum gas, propane, hydrogen, ethanol, methanol, butanol, or natural gas, and wherein the particular one vehicle is either a hybrid-electric vehicle or an autonomous vehicle;
determining, by the artificial intelligence fuel management device associated with the particular one vehicle of the plurality of vehicles, a present geographical position of the particular one vehicle;
receiving, by the artificial intelligence fuel management device associated with the particular one vehicle of the plurality of vehicles, a present position fuel management condition associated with the particular one vehicle, wherein the present position fuel management condition is defined as a function of at least the particular one vehicle's available range and vehicle endurance;
applying, by the artificial intelligence fuel management device associated with the particular one vehicle of the plurality of vehicles, the present position fuel management condition received for determining whether a refueling of the particular one vehicle is currently needed, and if the present position fuel management condition applied is indicative that the refueling is necessary then redirecting the particular one vehicle from the present geographical position determined to a particular one refueling station of a plurality of refueling stations that is most proximate to the particular one vehicle for the refueling thereof, and wherein at least one of refueling station is an automated fueling station;
receiving, by the artificial intelligence fuel management device associated with the particular one vehicle of the plurality of vehicles, a trip route to be undertaken by the particular one vehicle, the trip route received comprising one of a single destination route and a multi-destination route, wherein the single destination route comprises at least a pick-up location and a final destination location, and the multi-destination route comprises at least the pick-up location, the final destination location and at least one other destination location between the pick-up location and the final destination;
determining, by the artificial intelligence fuel management device associated with the particular one vehicle of the plurality of vehicles, if the trip route received is either the single destination route or the multi-destination route, and
in the event of the single destination route determination:
applying, by the artificial intelligence fuel management device associated with the particular one vehicle of the plurality of vehicles, a single destination route fuel management condition for determining whether the refueling of the particular one vehicle is currently needed before embarking on the trip route received, and if the single destination route fuel management condition applied is indicative that the refueling is necessary then redirecting, prior to initiating the trip route to the pick-up location, the particular one vehicle from the present geographical position determined to the particular one refueling station of the plurality of refueling stations that is most proximate to the particular one vehicle for the refueling, otherwise if the single destination route fuel management condition applied is indicative that the refueling is not necessary then completing the trip route received by the particular one vehicle and monitoring a plurality of real-time vehicle parameters during the completion thereof, and wherein the plurality of real-time vehicle parameters monitored comprise at least a vehicle endurance, a vehicle trip range, a vehicle engine operational current state, and total operational power requirements;

in the event of the multi-destination route determination:

applying, by the artificial intelligence fuel management device associated with the particular one vehicle of the plurality of vehicles, a multi-destination route fuel management condition for determining whether the refueling of the particular one vehicle is currently needed before embarking on the trip route, and if the multi-destination route fuel management condition applied is indicative that the refueling is necessary then redirecting, prior to initiating trip route to the pick-up location, the particular one vehicle from the present geographical position determined to the particular one refueling station of the plurality of refueling stations that is most proximate to the particular one vehicle for the refueling, otherwise if the multi-destination route fuel management condition applied is indicative that the refueling is not necessary then completing the trip route received by the particular one vehicle and monitoring the plurality of real-time vehicle parameters during the completion thereof; and determining, by the artificial intelligence fuel management device associated with the particular one vehicle of the plurality of vehicles, whether the particular one vehicle is currently in use on any trip route and if not currently in use and at an idling location, then applying a top-off fuel management condition for determining whether a top-off refueling of the particular one vehicle is currently needed to bring a current fuel level of the particular one vehicle equal to a maximum fuel tank capacity level of a fuel tank of the particular one vehicle, and if the top-off fuel management condition applied is indicative that the refueling is necessary then redirecting the particular one vehicle from the idling location to the particular one refueling station of the plurality of refueling stations that is most proximate to the particular one vehicle for the refueling, otherwise if the top-off fuel management condition applied is indicative that the refueling is not necessary then remaining at the idling location and monitoring the plurality of real-time vehicle parameters; and wherein the present position fuel management condition applied is given by:

if (i) available vehicle range at a current fuel level for the particular one vehicle and the vehicle weight confirmed therefore is equal to or less than (<=) thirty percent (30%) of a full fuel level range for the particular one vehicle; and (ii) available vehicle endurance at the current fuel level for the particular one vehicle and the vehicle weight confirmed therefore is equal to or less than (<=) two (2) hours of vehicle endurance, wherein the vehicle endurance is measured as a function of fuel needed to power the particular one vehicle's heating system, air conditioning system and total operational power requirements of the particular one vehicle;

then the refueling is necessary;

wherein the single destination route fuel management condition is given by:

if (an available vehicle range and endurance at a current fuel level of the particular one vehicle and the vehicle weight confirmed therefore)–(a necessary vehicle range and vehicle endurance to complete, at the vehicle weight confirmed therefore, the single destination route) is:

(i) less than or equal to (<=) thirty (30%) of a full fuel level range for the particular one vehicle at the vehicle weight confirmed therefore; or (ii) less than or equal to (<=) two (2) hours of vehicle endurance, wherein the vehicle endurance is measured as a function of fuel needed to power the particular one vehicle's heating system, air conditioning system and total operational power requirements of the particular one vehicle;

then the refueling is necessary;

wherein the multi-destination route fuel management condition applied is given by:

if (an available vehicle range and endurance at a current fuel level of the particular one vehicle and the vehicle weight confirmed therefore)–(necessary vehicle range and vehicle endurance to complete, at the vehicle weight confirmed therefore, the multi-destination route) is:

(i) less than or equal to (<=) twenty-five (25%) of a full fuel level vehicle range for the particular one vehicle at the vehicle weight confirmed therefore; or (ii) less than or equal to (<=) two (2) hours of vehicle endurance, wherein the vehicle endurance is measured as a function of fuel needed to power the particular one vehicle's heating system, air conditioning system and total operational power requirements of the particular one vehicle;

then the refueling is necessary; and wherein the top-off fuel management condition applied is defined by:

if (i) an available vehicle range at a current fuel level for the particular one vehicle and the vehicle weight confirmed therefore is less than or equal to (<=) seventy percent (70%) of a full fuel level vehicle range for the particular one vehicle at the vehicle weight confirmed therefore; and (ii) the present geographical position of the particular one vehicle is less than or equal to (<=) five hundred (500) meters from the particular one refueling station of the plurality of refueling stations that is most proximate to the particular one vehicle;

then the refueling is necessary.

\* \* \* \* \*